United States Patent
Simovitch

(10) Patent No.: US 11,644,426 B2
(45) Date of Patent: May 9, 2023

(54) METHODS AND SYSTEMS FOR GENERATING CALIBRATION DATA FOR WAFER ANALYSIS

(71) Applicant: Applied Materials Israel Ltd., Rehovot (IL)

(72) Inventor: Yariv Simovitch, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 240 days.

(21) Appl. No.: 16/990,593

(22) Filed: Aug. 11, 2020

(65) Prior Publication Data

US 2022/0050060 A1     Feb. 17, 2022

(51) Int. Cl.
| | | |
|---|---|---|
| *G01N 21/93* | (2006.01) | |
| *G01N 21/95* | (2006.01) | |
| *G06T 7/73* | (2017.01) | |
| *G06T 7/33* | (2017.01) | |
| *G06T 7/00* | (2017.01) | |

(52) U.S. Cl.
CPC ......... *G01N 21/93* (2013.01); *G01N 21/9501* (2013.01); *G06T 7/001* (2013.01); *G06T 7/337* (2017.01); *G06T 7/74* (2017.01); *G06T 2207/30148* (2013.01)

(58) Field of Classification Search
None
See application file for complete search history.

(56) References Cited

U.S. PATENT DOCUMENTS

| | | | |
|---|---|---|---|
| 9,599,575 B2 | 3/2017 | Goren et al. | |
| 2013/0204569 A1* | 8/2013 | Goren | G01N 21/9501 702/117 |
| 2016/0327629 A1* | 11/2016 | Pandharipande | G01S 5/0236 |
| 2020/0133140 A1* | 4/2020 | Warnaar | G03F 7/70641 |

* cited by examiner

*Primary Examiner* — Xiaolan Xu
(74) *Attorney, Agent, or Firm* — Kilpatrick Townsend & Stockton LLP

(57) ABSTRACT

Disclosed herein is a computer-implemented method for generating calibration data usable for analysis of a sample. The method includes: (i) identifying targets in an image frame pertaining to a scanned area of a sample; (ii) computing displacements of the targets relative to positions thereof as given by, or derived from, reference data of the scanned area; (iii) based at least on the computed target displacements, determining values of coordinate transformation parameters (CTPs) relating coordinates of the image frame to coordinates of the scanned area as given by, or derived from, the reference data; and (iv) using at least the CTPs to obtain displacements of multiple segments in the image frame, thereby generating a displacement mapping of the image frame or at least a part thereof.

20 Claims, 13 Drawing Sheets

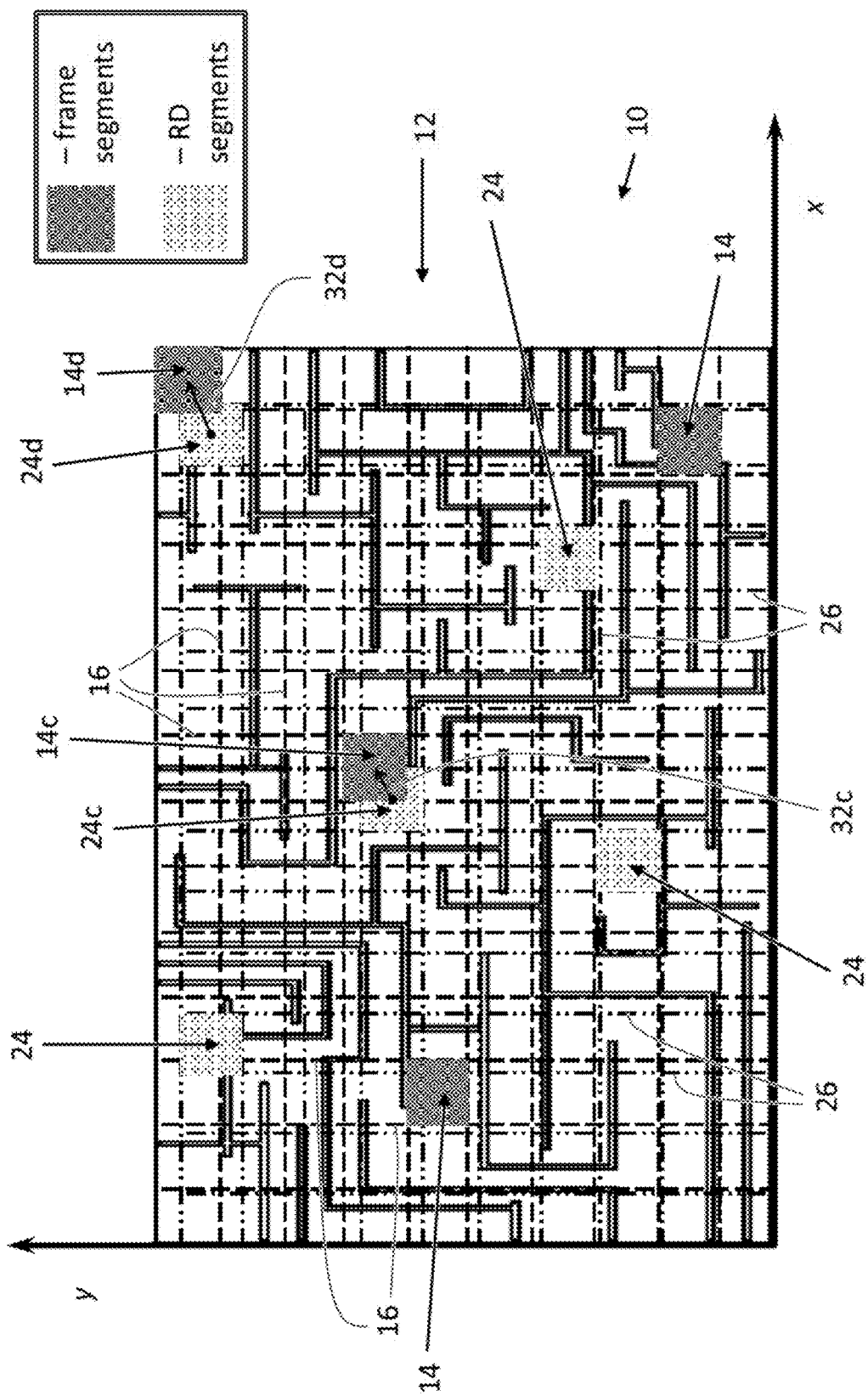

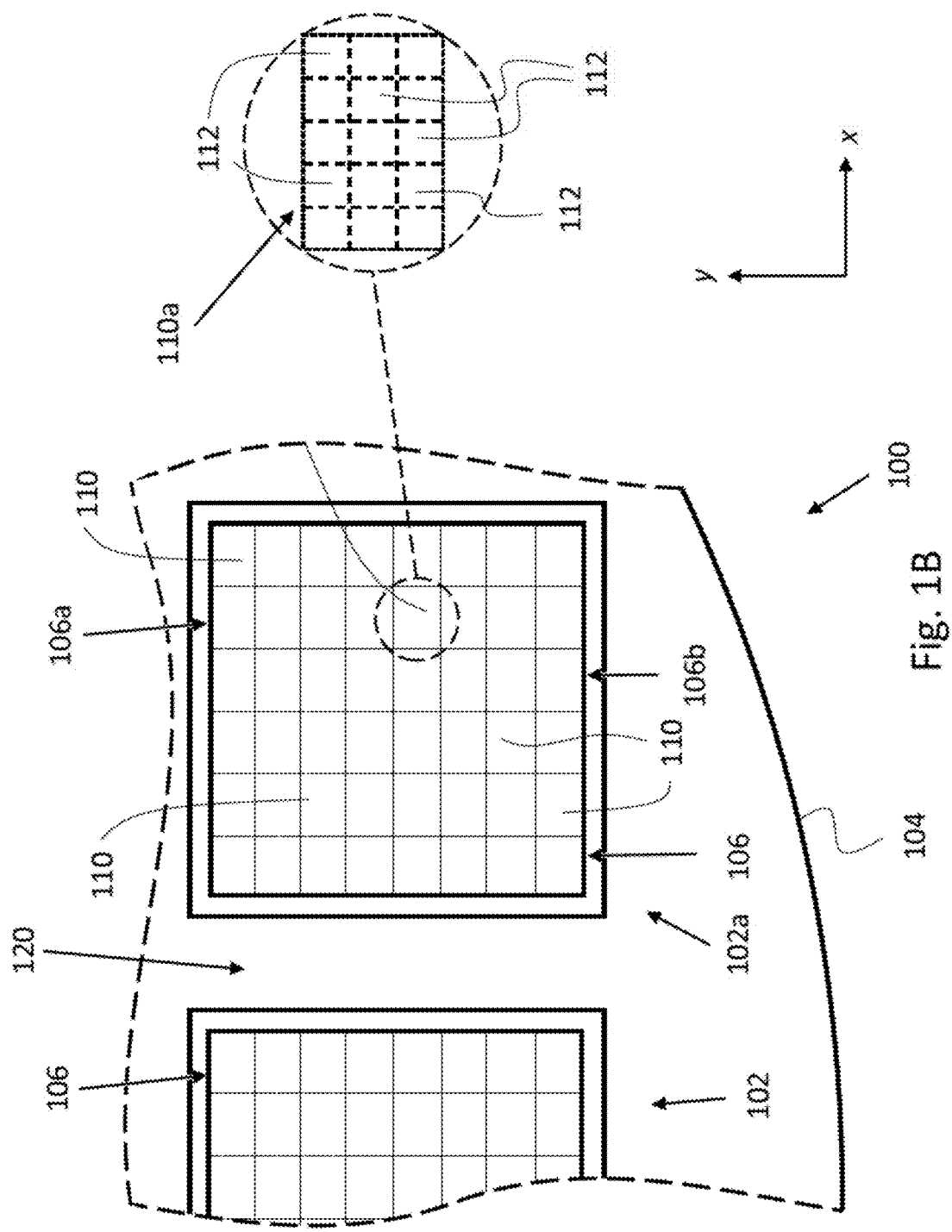

US 11,644,426 B2

METHODS AND SYSTEMS FOR GENERATING CALIBRATION DATA FOR WAFER ANALYSIS

TECHNICAL FIELD

The present disclosure relates generally to methods and systems for generating calibration data for wafer analysis.

BACKGROUND

Process diagnosis tools for semiconductor manufacturing, such as inspection, metrology, and review systems, often have a large field-of-view (FOV) in order to parallelize the data acquisition from an analyzed sample (e.g. a wafer, a photomask, or a reticle) and attain high processing speeds (throughput). A movable stage may be used to translate an inspected sample relative to an imaging apparatus, thereby allowing coverage of large areas on the sample. For example, a mechanical stage may move a wafer along a first direction, while the imaging apparatus collects data points along a second direction, which is perpendicular to the first direction. Slice-by-slice coverage of the wafer (or one or more areas thereof) is thus implemented, facilitating construction of two-dimensional images.

As design rules shrink, analysis of smaller structures on a sample becomes increasingly difficult. Tighter performance requirements are imposed on the analysis system and, in particular, on the localization accuracy of patterns on the sample. For example, a wafer inspection system will require higher localization accuracy to associate analysis parameters (e.g. of an analysis algorithm), and, more generally, an analysis algorithm, with a specific location on the wafer.

The challenge is made doubly difficult by temporal physical effects and imperfections, which adversely impact the localization accuracy, and which play an ever more significant role as design rules shrink. These include, for example, mechanical vibrations, thermal fluctuations, thermal expansion of the stage, release of mechanical tensions in optical modules and in the stage, mechano-optical drifts, atmospheric density instability, and uttering and/or acceleration (of the stage and/or sub-stages each configured to allow translating the stage along a (different) respective direction), which in turn induce additional mechanical vibrations.

Other imperfections may include misalignments of the stage axes. For example, a scanned wafer may be translated along a direction which is slightly offset with respect to the y-axis of the wafer (as defined by the die-columns on the wafer). And/or, for example, the FOV of the imaging apparatus (imager) may be slightly offset with respect to the x-axis of the wafer.

SUMMARY

Aspects of the disclosure, according to some embodiments thereof, relate to methods and systems for generating calibration data for sample analysis (analysis of e.g. a wafer, a photomask, or a reticle). More specifically, but not exclusively, aspects of the disclosure, according to some embodiments thereof, relate to methods and systems for generating position calibration data for analysis of patterned wafers.

Thus, according to an aspect of some embodiments, there is provided a computer-implemented method for generating calibration data usable for analysis of a sample. The method includes:

Identifying targets in an image frame pertaining to a scanned area of a sample (e.g. a wafer, a photomask, or a reticle).

Computing displacements of the targets relative to positions thereof as given (i.e. specified) by, or derived from, reference data of the scanned area.

Based at least on the computed target displacements, determining values of coordinate transformation parameters (CTPs) relating coordinates of the image frame to coordinates of the scanned area as given by, or derived from, the reference data.

Using at least the CTPs to obtain displacements of multiple segments in the image frame, thereby generating a displacement mapping of the image frame or at least a part thereof.

According to some embodiments of the method, the CTPs include at least three independent parameters.

According to some embodiments of the method, each of the at least three independent parameters characterizes a respective correlation which persists across the image frame.

According to some embodiments of the method, the CTPs include one or more of parameters characterizing global shifts, linear scaling, fixed-angle skewing, and rotations.

According to some embodiments of the method, the reference data include one or more of design data, CTPs and/or displacement mappings generated from scan data of the sample obtained during a recipe setup, and data obtained in a scan of another sample of the same design (as the analyzed sample) or including features of similar architecture to features within the scanned area.

According to some embodiments of the method, prior to the computing the displacements of the targets, the reference data is calibrated based on up-to-date system coordinates, which may have been generated taking into account previously obtained scan data (e.g. from previously scanned areas along the same slice). According to some such embodiments, the calibration includes rescaling of reference data coordinates.

According to some embodiments of the method, at least some of the segments have a size of a pixel.

According to some embodiments of the method, the sample is a patterned (first) wafer.

According to some embodiments of the method, the scanned area is positioned along a slice extending through a first die of the wafer, and the method further includes repetition thereof with respect to other scanned areas of the first die, which are positioned along the slice.

According to some embodiments of the method, the CTPs of at least one (i.e. at least one area) of the scanned area and the one or more other scanned areas are determined taking into account one or more previously determined CTPs of previously scanned areas along the slice.

According to some embodiments of the method, the method further includes an initial operation, which includes optimizing (i) a height of image frames—pertaining to the scanned areas, respectively, along the slice—and (ii) a choice of the CTPs, such as to attain a required accuracy at a maximum, or substantially maximum, throughput.

According to some embodiments of the method, the method further includes saving generated CTPs and, optionally, displacement mappings of image frames pertaining to previously scanned areas along the slice.

According to some embodiments of the method, the method further includes generating displacement mappings of additional images frames respectively pertaining to additional scanned areas along the slice, which are positioned in additional dies along a die-column comprising the first die.

Displacement mappings of a first group of the additional image frames may be directly generated based at least on computed displacements of targets therein (i.e. in the images frames) relative to corresponding positions of the targets as given by reference data. Displacement mappings of a second group of image frames may be generated based at least on computed displacements of targets therein relative to calibrated positions of corresponding targets in corresponding image frames, which pertain to scanned areas in a respective previously scanned die (e.g. in an adjacent die) in the die-column.

According to some embodiments of the method, the previously scanned die is a last scanned die.

According to some embodiments of the method, the method includes repetition thereof slice-by-slice, thereby generating calibration data for one or more die-columns of the wafer.

According to some embodiments of the method, the method further includes generating displacement mappings of additional areas in other dies along a die-column within a slice, which includes the first die. Every pre-determined number of dies along the die-column, displacement mappings of image frames of a next die in the die-column are directly generated from reference data. For the rest of the dies in the die-column, displacement mappings of image frames of each are determined based at least on calibration data of corresponding image frames in an adjacent and previously scanned die in the die-column.

According to some embodiments of the method, when a (given) image frame, which pertains to one of the other, or one of the additional, scanned areas along the slice, is characterized by (i) an insufficient number of identifiable targets and/or (ii) an insufficiently uniform distribution of identifiable targets, such that (i.e. in the sense that), based solely on displacements of identifiable targets in the given image frame, a required accuracy of a displacement mapping of the given image frame is not attainable, the displacement mapping of the given image frame is interpolated or extrapolated based on, or also taking into account, calibration data of image frames pertaining to scanned areas near the scanned area, which pertains to the given image frame.

According to some such embodiments of the method, the method further includes scanning the sample.

According to some embodiments of the method, the method may be implemented in runtime as the sample is being scanned.

According to some embodiments of the method, the method may be implemented off-tool using saved scan data of the sample.

According to some embodiments of the method, the reference image(s) has a width (perpendicular to the mechanical scan direction) of at least about 100 pixels.

According to some embodiments of the method, the reference image(s) has a width of at least about 1000 pixels.

According to an aspect of some embodiments, there is provided a computer-implemented method for analysis of a sample. The method includes generating calibration data pertaining to image frames of areas along a slice on a sample by performing the above-disclosed methods, and using the calibration data to associate one or more defect detection algorithms with respective subframes in the image frames, wherein the calibration data include CTPs and/or displacement mappings of the image frames.

According to an aspect of some embodiments, there is provided a non-transitory computer-readable medium. The computer-readable medium has stored therein instructions, executable by a computerized system (such as the computerized system and the sample analysis system described below), for implementing the above-described method for generating calibration data usable for sample analysis.

According to an aspect of some embodiments, there is provided a computerized system for generating calibration data usable for analysis of a sample. The system includes a displacement analysis module. The displacement analysis module is configured to:

Compute displacements of targets, identified in one or more image frames pertaining to one or more scanned areas of a sample, respectively, relative to positions thereof as given by, or derived from, reference data of the one or more areas.

Based at least on the computed target displacements, determine values of coordinate transformation parameters (CTPs) relating coordinates of the one or more image frames to coordinates of the scanned areas as given by, or derived from, the reference data of the one or more areas, respectively.

Use at least the CTPs to determine displacements of multiple segments in the one or more image frames, thereby generating one or more displacement mappings of the one or more image frames or at least of one or more parts thereof.

According to some embodiments of the computerized system, the CTPs include at least three independent parameters.

According to some embodiments of the computerized system, each of the at least three independent parameters characterizes a respective correlation which persists across each of the image frames.

According to some embodiments of the computerized system, the CTPs include one or more of parameters characterizing global shifts, linear scaling, fixed-angle skewing, and rotations.

According to some embodiments of the computerized system, the reference data include one or more of design data, CTPs and/or displacement mappings generated from scan data of the sample obtained during a recipe setup, and data obtained in a scan of another sample of the same design (as the analyzed sample) or including features of similar architecture to features within the one or more scanned areas.

According to some embodiments of the computerized system, prior to the computing the displacements of the targets, the reference data is calibrated based on up-to-date system coordinates, which may have been generated taking into account previously obtained scan data (e.g. from previously scanned areas along the same slice). According to some such embodiments, the calibration includes rescaling of reference data coordinates.

According to some embodiments of the computerized system, at least some of the segments have a size of a pixel.

According to some embodiments of the computerized system, the sample is a patterned (first) wafer.

According to some embodiments of the computerized system, the scanned area is positioned along a slice extending through a first die of the wafer, and the displacement analysis module is further configured to generate calibration data with respect to image frames respectively pertaining to other scanned areas of the first die, which are positioned along the slice.

According to some embodiments of the computerized systems, the CTPs of at least one (i.e. at least one area) of the scanned area and the one or more other scanned areas are determined taking into account one or more previously determined CTPs of previously scanned areas along the slice.

According to some embodiments of the computerized system, the displacement analysis module is further configured to perform an initial operation, which includes optimizing (i) a height of image frames—pertaining to the scanned areas, respectively, along the slice—and (ii) a choice of the CTPs, such as to attain a required accuracy at a maximum, or substantially maximum, throughput.

According to some embodiments of the computerized system, the computerized system is configured to save generated CTPs and, optionally, displacement mappings of image frames pertaining to previously scanned areas along the slice.

According to some embodiments of the computerized system, the computerized system is further configured to generate displacement mappings of additional images frames respectively pertaining to additional scanned areas along the slice, which are positioned in additional dies along a die-column comprising the first die. Displacement mappings of a first group of the additional image frames may be directly generated based at least on computed displacements of targets therein (i.e. in the images frames) relative to corresponding positions of the targets as given by reference data. Displacement mappings of a second group of image frames may be generated based at least on computed displacements of targets therein relative to calibrated positions of corresponding targets in corresponding image frames, which pertain to scanned areas in a respective previously scanned die (e.g. in an adjacent die) in the die-column.

According to some embodiments of the computerized system, the previously scanned die is a last scanned die.

According to some embodiments of the computerized system, the displacement analysis module is further configured to generate calibration data pertaining to scanned areas on the wafer slice-by-slice, thereby generating calibration data for one or more die-columns of the wafer.

According to some embodiments of the computerized system, the displacement analysis module is further configured to generate displacement mappings of additional areas in other dies along a die-column within a slice, which includes the first die. Every pre-determined number of dies along the die-column, displacement mappings of image frames of a next die in the die-column are directly generated from reference data. For the rest of the dies in the die-column, displacement mappings of image frames of each are determined based at least on calibration data of corresponding image frames in an adjacent and previously scanned die in the die-column.

According to some embodiments of the computerized system, the displacement analysis module is further configured to—when an image frame, which pertains to one of the other, or one of the additional, scanned areas along the slice, is characterized by (i) an insufficient number of identifiable targets and/or (ii) an insufficiently uniform distribution of identifiable targets, such that, based solely on displacements of identifiable targets in the image frame, a required accuracy of a displacement mapping of the image frame is not attainable—interpolate or extrapolate the displacement mapping of the image frame based on, or also taking into account, calibration data of image frames pertaining to scanned areas near the scanned area, which pertains to the image frame.

According to some embodiments of the computerized system, the displacement analysis module is further configured to generate the displacement mappings in runtime as the wafer is being scanned. According to some such embodiments, the computerized system may be configured to receive scan data of the wafer in real-time or near real-time (and to generate the displacement mappings based thereon) from a wafer inspection tool scanning the wafer. Alternatively, the computerized system may be configured to scan the wafer.

According to some embodiments of the computerized system, an imager of the computerized system has a FOV of at least about 100 pixels.

According to some embodiments of the computerized system, an imager of the computerized system has a FOV of at least about 1000 pixels.

According to some embodiments of the computerized system, the computerized system may be configured to generate the displacement mapping(s) off-tool using saved scan data of the sample.

According to an aspect of some embodiments, there is provided a sample analysis system (e.g. a wafer analysis system) including a computerized system for generating calibration data as described above.

According to some embodiments of the sample analysis system, the sample analysis system further includes:
  Scanning equipment including an imager and configured to scan a region of a sample.
  A processing and memory circuitry including the computerized system and a sample analysis module (e.g. a wafer analysis module). The sample analysis module is configured to detect potential defects in one or more areas of the region taking into account displacement mappings of the one or more areas generated by the displacement analysis module of the computerized system.

According to some embodiments of the sample analysis system, the imager is, or includes, an optical-based imager.

According to some embodiments of the sample analysis system, the optical-based imager includes a large field-of-view scanning tool (i.e. corresponding to at least one thousand pixels).

According to some embodiments of the sample analysis system, the imager includes a scanning electron microscope.

According to some embodiments of the sample analysis system, the processing and memory circuitry further includes an image processing module. The image processing module is configured to:
  Receive image frame data of one or more areas imaged by the imager;
  Identify resolvable targets within the one or more areas.
  Send image data of the identified targets to the displacement analysis module.

According to an aspect of some embodiments, there is provided a non-transitory computer-readable medium. The computer-readable medium includes instructions, executable by a processing circuitry of a system for generating calibration data usable for analysis of a sample. The instructions are configured to cause the system to:
  Identify targets in an image frame corresponding to a scanned area of a sample.
  Compute displacements of the targets relative to positions thereof as given by, or derived from, reference data of the scanned area.
  Based at least on the computed target displacements, determine values of coordinate transformation parameters (CTPs) relating coordinates of the image frame to coordinates of the scanned area as given by, or derived from, the reference data.

Use at least the CTPs to obtain displacements of multiple segments in the image frame, thereby generating a displacement mapping of the image frame or at least a part thereof.

According to an aspect of some embodiments, there is provided a wafer analysis method into which the above-described method is incorporated. The wafer analysis method may be a process-diagnosis task, which may be any one of wafer inspection, metrology, and/or review.

As will be evident to the skilled person, the techniques, systems, methods, and computer program products of the present disclosure are applicable not only for wafer analysis, but also to analysis of photomasks and reticles used in semiconductor manufacturing. The scope of the disclosure is thus understood to cover not only wafer analysis, but also analysis of photomasks and reticles used in the manufacturing of wafers.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" and the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale. Moreover, two different objects in the same figure may be drawn to different scales. In particular, the scales of some objects may be greatly exaggerated as compared to other objects in the same figure.

In the figures:

FIG. 1A schematically depicts an example displacement mapping, according to some embodiments;

FIG. 1B schematically depicts dies on a wafer, according to some embodiments;

DETAILED DESCRIPTION

Figure 2:
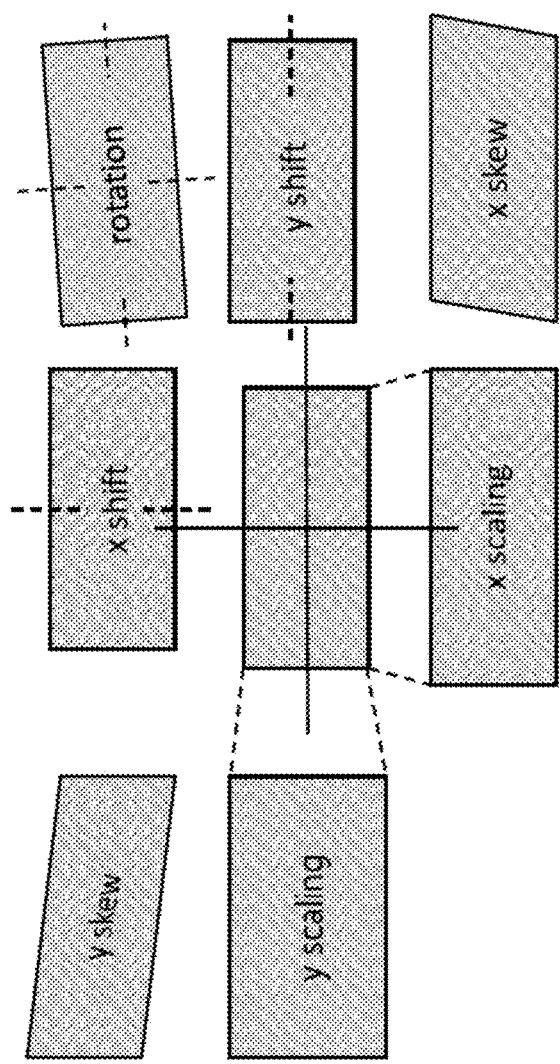
FIG. 2 schematically depicts linear coordinate transformations relevant for wafer analysis, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "substantially" may be used to specify that a first property, quantity, or parameter is close or equal to a second or a target property, quantity, or parameter. For example, a first object and a second object may be said to be of "substantially the same length", when a length of the first object measures at least 80% (or some other pre-defined threshold percentage) and no more than 120% (or some other pre-defined threshold percentage) of a length of the second object. In particular, the case wherein the first object is of the same length as the second object is also encompassed by the statement that the first object and the second object are of "substantially the same length".

According to some embodiments, the target quantity may refer to an optimal parameter, which may in principle be obtainable using mathematical optimization software. Accordingly, for example, a value assumed by a parameter may be said to be "substantially equal" to the maximum possible value assumable by the parameter, when the value of the parameter is equal to at least 80% (or some other pre-defined threshold percentage) of the maximum possible value. In particular, the case wherein the value of the parameter is equal to the maximum possible value is also encompassed by the statement that the value assumed by the parameter is "substantially equal" to the maximum possible value assumable by the parameter.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

For ease of description, in some of the figures a three-dimensional cartesian coordinate system (with orthogonal axes x, y, and z) is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

Referring to the figures, in flowcharts, optional operations may appear within boxes delineated by a dashed line.

Introduction

Disclosed herein are systems and methods for (runtime as well as "off-tool") generation of displacement mappings of a scanned area(s) on a wafer. According to some embodiments, the disclosed systems and methods are aimed at addressing temporal instabilities (due to, for example, the temporal physical effects and imperfections listed in the Background), which adversely impact runtime wafer analysis. Ideally—that is, in the absence of temporal instabilities—the data points (collected by the imaging apparatus used to scan the wafer) would form a grid which is fixed in time. In contrast, temporal instabilities generally give rise to a temporally non-rigid grid (of the collected data points). The obtained uncertainties in the (position) coordinates of each grid point are on the order of tens or even hundreds of nanometers and so violate design rules of advanced technology nodes.

As used herein, a computational task (e.g. generation of a displacement mapping(s)) may be said to be run "off-tool" when implemented after the completion of a scan in which the scan data—processed in the computational task—were obtained. Thus, a computational task implemented with respect to scan data of a sample is run off-tool when performed after the scan of the sample (in which the scan data were obtained).

FIG. 1A schematically depicts an example displacement mapping 10, according to some embodiments. An (image) frame 12 pertaining to a scanned wafer area (such as an area 110a in FIG. 1B) is shown. Frame 12 is shown partitioned (divided) into frame segments 14, as indicated by a dashed grid 16 which is superimposed on frame 12. Each of frame segments 14 may correspond to a single pixel. Also superimposed on frame 12 is a dashed double-dotted grid 26. Dashed double-dotted grid 26 is generated based on reference data (such as a CAD-based simulated image (not shown)) corresponding to the wafer area represented by frame 12. Dashed double-dotted grid 26 is partitioned into reference data (RD) segments 24. The reference data specify the expected positions of segments according to a default coordinate system available prior to the start of the scan.

Grids 16 and 26 are seen to differ from one another due to physical effects and imperfections, as described above and as further elaborated on below. Each of RD segments 24 of dashed double-dotted grid 26 corresponds to a respective frame segment from frame segments 14. The superimposing of (dashed double-dotted) grid 26 on (dashed) grid 16 provides a graphical representation of the displacements of each of frame segments 14 relative to the respective reference data positions thereof. For example, the displacement of a frame segment 14c relative to the reference data position thereof (indicated by a RD segment 24c) is indicated by an arrow 32c. Similarly, a displacement of a frame segment 14d relative to the reference data position thereof (indicated by a RD segment 24d) is indicated by an arrow 32d. In particular, arrows 32c and 32d are seen to differ from one another both in length and orientation, reflecting the sensitivity of the disclosed methods and systems to displacements and deformations of scanned images (image frames) at the sub-pixel level.

Reference is now made to FIG. 1B, which also serves for introducing terminology. Depicted is a die 102a on a wafer 100 (which is only partially shown), such as wafers used in the fabrication of integrated circuits and other micro-devices. As used herein, unless specified otherwise, the term "wafer" will be used to refer to a "processed" or "patterned" wafer (including the electronic circuits fabricated thereon). Wafer 100 includes multiple dies 102 (of which only die 102a is shown in full). Dies 102 may be arranged in die-columns (columns of dies) on the wafer. Die 102a is depicted in a widely implemented rectangular form, but it will be understood that other forms may apply. Dies 102 may also include partial edge-dies, which reside on the round wafer boundaries. Similarly to the term "wafer", unless specified otherwise, the term "die" will be used to refer to a small block of semiconducting material on which an electronic circuit has been fabricated.

Also indicated in FIG. 1B is an edge 104 of wafer 100.

Wafer 100 is configured to be cut ("diced") into separate dies. Each of the dies may contain a copy of the same electronic circuit, or some of the dies may contain different electronic circuits, respectively. The scope of the disclosure will be understood to cover both options.

Each column of dies (die-columns), to be scanned, is partitioned into adjacent (scanning) slices 106, such as adjacent slices 106a and 106b, which extend (along the y-axis) through die 102a. According to some embodiments, each of slices 106 may correspond, or substantially correspond, in width to the x-dimension of a field-of-view (FOV) of an imaging apparatus. In other words, each of slices 106 may represent partial "coverage" of wafer 100 due to a respective scanning path along wafer 100. It should be noted that while in FIG. 1B, slices 106 are depicted as straight, scanning paths are not limited to straight lines, and may follow any curved line as required, as is the case, for example, in spiral scanning in R-Theta stages. According to some embodiments (not depicted in FIG. 1B), adjacent slices may partially overlap to ensure full (i.e. 100%) coverage of the dies. Different areas 110 on die 102a are indicated. One of areas 110, area 110a, is shown partitioned (divided) into segments 112. Segments 112 are shown as rectangular, but it will be understood that other shapes may apply. Each of segments 112 may correspond to a group of adjacent pixels, or even to a single pixel, in an image frame pertaining to area 110a, such as frame 12 in FIG. 1A.

Depending on the scanning recipe, a die may be scanned in part or in full. Further, dies 102 may differ in size (due to their design). In particular, according to some embodiments, dies along a same die column may differ in width. Accordingly, the width of a slice may change along the length thereof. More specifically, according to some embodiments, the imaging apparatus may be configured to adjust the FOV thereof—in runtime—in accordance with the width of a currently scanned die. In addition, the spacing between dies on a wafer (e.g. wafer 100) may also vary. Depending on the scanning recipe, areas between dies, such as an area 120 in FIG. 1B, may also be scanned.

To achieve high throughputs, large FOVs (e.g. on the order of thousands to tens of thousands of pixels) may be used to parallelize data grabbing and analysis. However, the larger the FOV, the greater the variation between the optical paths travelled by light rays returning (e.g. reflected, scattered) from different locations (field points) on the wafer. In particular, the greater the FOV, the greater the variation in the lengths of the optical paths travelled by different light rays, and, consequently, the greater the distortions to the image frames due to temporal physical effects, as listed above.

It is a challenge to reliably and efficiently account for these distortions. That is, to be able to reliably and efficiently associate every segment (e.g. every pixel) of an image frame with a reference data position (i.e. the position as determined by reference data) of the segment. Additional related challenges occur when the image frame is not sufficiently densely, and/or sufficiently uniformly, populated with resolvable targets or does not include a unique pattern(s): In particular, the image frame may include one or more unresolvable subframes (which do not include any resolvable targets), each of which may include, for example, hundreds of thousands of pixels, or even several millions pixels.

To this end, the present disclosure teaches how to obtain a coordinate transformation relating the coordinates of an image frame, pertaining to a scanned wafer area, to the coordinates of reference data describing the wafer, and, in particular, the scanned wafer area. According to some embodiments, the coordinate transformation allows associating each pixel of an image frame with corresponding reference data coordinates (for example, in units of microns or nanometers), and thereby to obtain a displacement mapping. The displacement mapping may specify the displacement of each pixel relative to the reference data position thereof, thereby generating calibration data at the resolution of even a single pixel (in the sense that the computed displacement of a pixel may differ from each of the surrounding pixels).

The coordinate transformation, and consequently the displacement mapping, are generated based on computed displacements of (identifiable) targets in the image frame relative to the reference data positions thereof. Advantageously, the generated displacement mappings may also account for subframes of the image frame, which do not include any registration target(s), such as subframes consisting of unresolved arrays, low contrast features, saturated features, and/or the like.

To specify a coordinate transformation, values of coordinate transformation parameters $\{C\}$ should be provided. For example, a two-dimensional global translation (shift) may be specified by two values which represent translations along e.g. the x and y axes. The choice of the set of coordinate transformation parameters (CTPs) may be based on prior knowledge of the architecture and temporal behavior of the analysis system and characteristics of the wafer.

For a given set of CTPs (e.g. global displacements and rotations), the values of the CTPs may be obtained based on the computed target displacements (also referred to as "displacement data"). More precisely, displacement data fitting may be employed to obtain (optimal) values of the CTPs. According to some embodiments, high-accuracy displacement mappings may be achieved even when restricting to linear coordinate transformations. As depicted in FIG. 2, linear coordinate transformations include global shifts (e.g. along the x and y axes), linear scaling (along the x and y axes), fixed-angle skewing (relative to the x and y axes), and rotations.

Global shifts may arise, for example, from inaccurate placement of the wafer on the stage (the plane of the stage is assumed to be parallel to the xy-plane). Linear scaling may arise from magnification changes or changes in scanning speed. Assuming that the stage is intended to be translated along the y-axis, x-skewing may result from slight (angular) offsetting of the stage translation direction or low-frequency jitter (of the stage) in parallel to the x-axis. y-skewing may result from wafer rotation or low-frequency jitter (of the stage) in parallel to the y-axis. It is noted that to first order, rotations and skewing are indistinguishable.

More generally, it is to be understood that the set of CTPs may include any transformation parameter characterizing a correlation which persists across the image frame (i.e. along the height and width thereof).

Figure 3B:
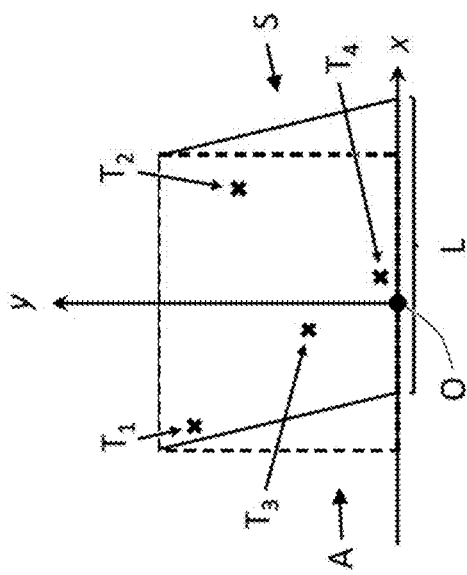
FIGS. 3A-3E schematically depict an example coordinate transformation relating coordinates parameterizing an image frame pertaining to a scanned wafer area and coordinates parameterizing a reference data area corresponding to the wafer area, according to some embodiments.
Figure 3C:
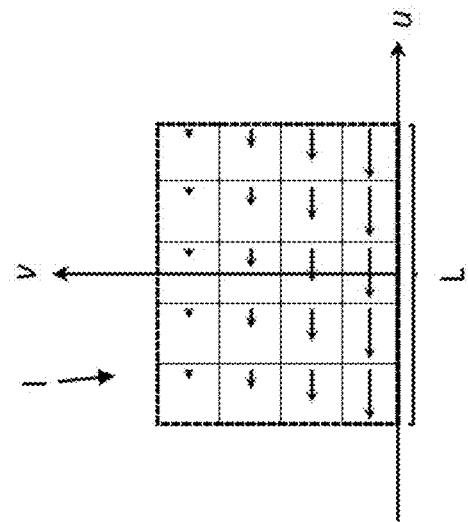
Figure 3E:
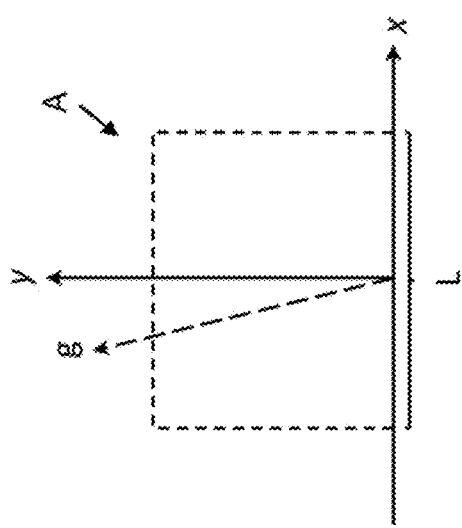
Figure 3F:
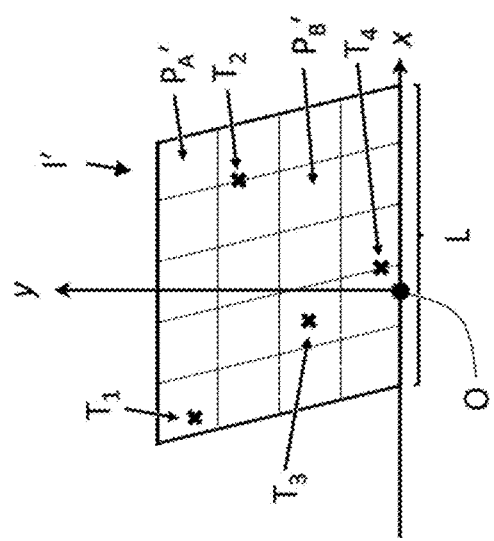
FIG. 3F is a graphical representation of a displacement mapping obtained from the coordinate transformation of FIGS. 3A-3E, according to some embodiments.
Figure 3A:
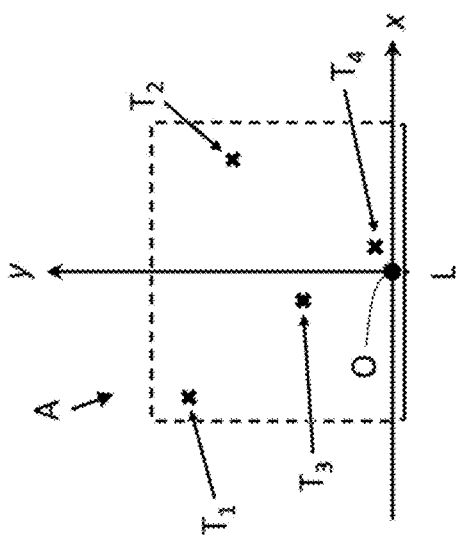

FIGS. 3A-3E schematically depict an example coordinate transformation M relating the coordinates of an image frame of a scanned wafer area and the coordinates of reference data of the wafer area. More specifically, FIG. 3A schematically depicts a rectangular area A (marked by a dashed line) on a die of a wafer (such as area 110a on wafer 100), which is intended to be scanned. Also depicted are targets $T_1$, $T_2$, $T_3$, and $T_4$ within area A. An origin O of the coordinate system (i.e. the point whose coordinates are given by x=0 and y=0) is also indicated.

To facilitate the description and render the discussion more concrete, constant x-skewing, with no other physical effects and imperfections, is assumed. Referring to FIG. 3B, a dashed arrow g represents the actual direction of motion of the stage on which the scanned wafer is placed, and thus indicates the degree of skewing. Due to the skewing, area A will only be partially scanned. FIG. 3C schematically depicts a scanned area S, which is the area that is actually scanned. Since over scanned area S the skewing is constant (i.e. does not vary within the "grabbing" time of scanned area S), scanned area S has the shape of a parallelogram.

Figure 3D:
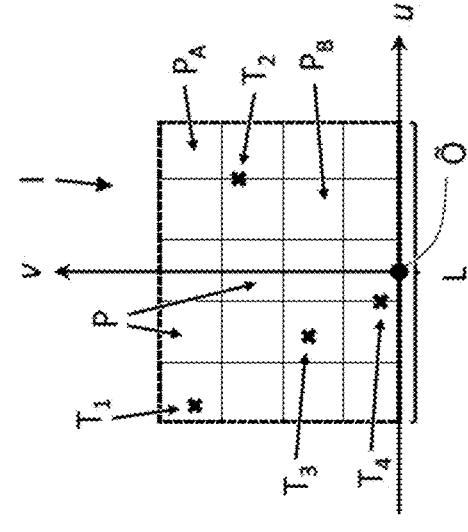

FIG. 3D depicts an (image) frame I, which is obtained from the imaging apparatus and which corresponds to scanned area S. Frame I is shown partitioned into pixels P. The horizontal and vertical axes in FIG. 3D are labeled by u and v, respectively, in order to emphasize that the frame coordinates may generally differ from the wafer coordinates (i.e. x and y in FIG. 3B). Also indicated is an origin Õ of the frame coordinate system (i.e. the point whose coordinates are given by u=0 and v=0). The displacement of the targets relative to the positions thereof in FIG. 3C is clearly noticeable.

FIG. 3E schematically depicts a "deformed" image I' corresponding to frame I when presented in terms of the reference coordinates, or, what in this example amounts to the same thing, the wafer coordinates. Deformed image I' may be obtained from frame I using the coordinate transformation M (or the inverse thereof depending on how the coordinate transformation M is defined).

Also indicated in FIG. 3E are pixels $P'_A$ and $P'_B$ of deformed image I' corresponding, respectively, to pixels $P_A$ and $P_B$ of frame I.

As explained in detail below, the coordinate transformation M is obtained using numerical fitting methods based on computed displacements of the targets within frame I. Targets $T_1$, $T_2$, $T_3$, and $T_4$, indicated in FIG. 3D, are also indicated in FIG. 3E to illustrate the displacements thereof. More specifically, if in FIG. 3D the position of target $T_1$ is given by the vector $(u_1, v_1)$, and in FIG. 3E the position of target $T_1$ is given by the vector $(x_1, y_1)$, then the displacement of target $T_1$ is given by the difference of the two vectors: $(u_1-x_1, v_1-y_1)$.

FIG. 3F is a schematic graphical depiction of a displacement mapping D obtained from coordinate transformation M. More specifically, frame I is depicted partitioned into pixels P. Within each of pixels P a respective arrow is drawn representing the direction and the relative magnitude of the displacement of the pixel relative to the position thereof in image I'.

Referring again also to FIGS. 3A-3E, a width L of frame I (and of area A) may correspond to (i) the full width (i.e. the x-dimension) of the FOV of an imaging apparatus used to scan the wafer, or (ii) a fraction (i.e. part) of the width of the FOV. As elaborated on below, the height of frame I (and of area A) may be selected such as to achieve a required (or desired) accuracy of the displacement mapping D (e.g. such that the displacement of each pixel is determined to a required accuracy).

Systems

Figure 4A:
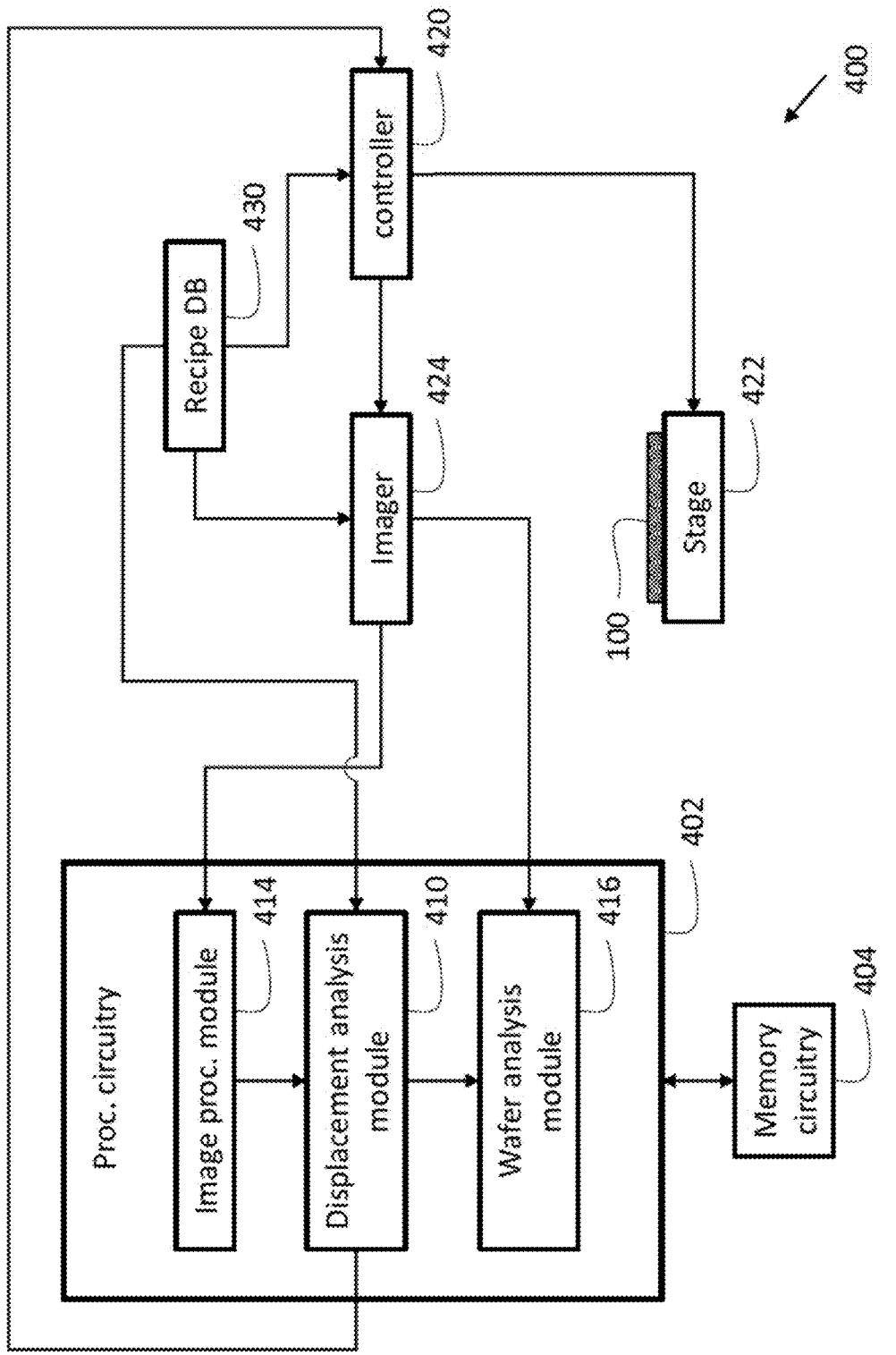
FIG. 4A is a block diagram of a computerized system for generating calibration data for wafer inspection, according to some embodiments.

According to an aspect of some embodiments, there is provided a computerized system for generating calibration data usable for inspection of a wafer, such as wafer 100. FIG. 4A presents a block diagram of such a computerized system, a computerized system 400, according to some embodiments. According to some embodiments, system 400 may be combined with an inspection machine used for inspecting wafers (e.g. during different stages of manufacturing thereof) or may be connected to such a machine. According to some embodiments, system 400 may be integrated into an inspection system into which some or all of the functions and/or features, described herein below, have been incorporated. According to some embodiments, and as depicted in FIG. 4A, system 400 may be additionally configured for performing process-diagnosis tasks such as wafer inspection, metrology, and/or review.

System 400 includes a processing circuitry 402, including one or more processors, and a memory circuitry 404, including one or more memories and functionally associated with processing circuitry 402. Processing circuitry 402 includes at least a displacement analysis module 410. Displacement analysis module 410 is configured to determine displacements of segments in an image frame pertaining to a scanned wafer area.

As used herein, the term "processing and memory circuitry" may be used to jointly refer to a processing circuitry and a memory circuitry, which is functionally associated with the processing circuitry, such as processing circuitry 402 and memory circuitry 404.

More specifically, displacement analysis module 410 is configured to determine values of coordinate transformation parameters (CTPs) specifying a coordinate transformation, which relates a first set of coordinates to a second set of coordinates. The first set of coordinates may parameterize an image frame of a scanned wafer area. The second set of coordinates may parameterize a corresponding area as specified by reference data of the wafer (possibly after rescaling in accordance with up-to-date system coordinates, as explained below). The coordinate transformation is configured to account for temporal physical effects and imperfections affecting the wafer and the setup during the scanning of the wafer, as well as imperfections which may have already been present in the wafer (e.g. warping due to induced stresses during manufacture) prior to the scanning thereof As explained above, the physical effects and imperfections "show up" in the image frame. To remove the imperfections, the image frame is calibrated.

Memory circuitry 404 may include non-volatile and volatile memory components. Memory circuitry 404 may have stored therein instructions executable by displacement analysis module 410 to determine the values of the CTPs, as described above. According to some embodiments, memory circuitry 404 may be configured to function as a "tracking" database and temporarily store CTPs and, optionally, displacement mappings (generated by displacement analysis module 410) of image frames. In particular, memory circuitry 404 may be configured to temporarily store displacement mappings of image areas which are densely populated by resolvable targets. The stored displacement mappings may be used in the generation of displacement mappings of sparsely populated neighboring image areas, as explained below in the description of FIG. 6.

According to some embodiments, processing circuitry 402 further includes an image processing module 414. According to some embodiments, processing circuitry 402 further includes a wafer analysis module 416. The functions of image processing module 414 and wafer analysis module 416 are described below.

Each of displacement analysis module 410, image processing module 414, and wafer analysis module 416 may be implemented by one or more processors. According to some embodiments, each of the one or more processors may be specific to a module and independent from those of the other modules. Alternatively, according to some embodiments, one or more of the processors may be "shared" by some of the modules. The above-listed modules may also include software processing modules and/or firmware processing modules.

According to some embodiments, system 400 further includes a controller 420, a movable stage 422, and an imager 424 (e.g. an imaging apparatus). Controller 420 is functionally associated with stage 422, imager 424, as well as with processing circuitry 402. More specifically, controller 420 may be configured to control and synchronize operations and functions of the above-listed modules and components during a scan of a wafer. For example, stage 422 may be configured to support an inspected sample, such as wafer 100, and to mechanically translate the inspected sample along a scan-path set by controller 420, which may also control imager 424. Stage 422 may include multi-axis sub-stages, which allow to translate a wafer along any scanning path—including also curved scanning paths—given by controller 420.

Imager 424 is configured for scanning wafers, such as wafer 100. Imager 424 may include scanning, imaging, and/or detection apparatus, as known in the art of wafer analysis. More specifically, imager 424 may include a light source for producing a light beam configured to impinge on the wafer, and one or more sensors configured to detect light returned from the wafer. According to some embodiments, the produced light beam may be coherent, e.g. when the light source is a laser. According to some embodiments, the light beam may be incoherent. According to some embodiments, imager 424 may have a large FOV (e.g. on the order of thousands to tens of thousands of pixels). As used herein, according to some embodiments, a scanning tool, such as imager 424, is said to have a large FOV when the FOV corresponds to at least one thousand pixels, five thousand pixels, or ten thousand pixels. Each possibility corresponds to separate embodiments. According to some embodiments, imager 424 may be configured to produce multiple scanning spots, e.g. using of diffraction optical elements.

According to some embodiments, imager 424 operation may be based on multi-spot scanning. Alternatively, according to some embodiments, image 424 operation may be based on flood illumination, in which case imager 424 may include a one-dimensional or two-dimensional pixel array camera.

Additionally, or alternatively, imager 424 may include a charged particles source for producing a beam of charged particles configured to impinge on the wafer, and one or more sensors configured to detect charged particles deflected off the wafer. According to some embodiments, imager 424 may be, or include, a multi-beam and/or a multi-channel charged particles imaging system. According to some embodiments, imager 424 includes a scanning electron microscope (SEM).

By way of example, to implement the scanning, wafer 100 may be placed on a movable stage, such as stage 422. In such embodiments, wafer 100 is translated by stage 422 during the scanning of wafer 100. For example, stage 422 may be moved along one or more of the x-axis, y-axis, and z-axis, as required by the analysis protocol and the scanning recipe. (Here, the x and y axes are defined as being parallel to the "axes" of wafer 100, and the z-axis is defined as being perpendicular to wafer 100). Additionally, or alternatively, imager 424 may be repositioned in order to image different parts of wafer 100. The scanning may be based on scanning instructions sent to imager 424 from a (scanning) recipe database 430.

According to some embodiments, an alignment module (e.g. in controller 420 or distinct therefrom) may be used to align wafer 100 on stage 422, e.g. during setup, prior to the start of the scan (of the wafer). According to some embodiments, the alignment may be implemented using anchor points from the reference data.

Imager 424 is configured to transmit scanned image data (image frame data), obtained thereby, of wafer 100 to image processing module 414. Image processing module 414 is configured to identify pre-defined targets (which may be defined by the scanning recipe) within an image frame pertaining to a scanned wafer area, such as area 110a of wafer 100. More specifically, according to some embodiments, image processing module 414 may be configured to, for each target in the image frame: (i) compute the expected position of the target based on up-to-date system coordinates and reference data position of the target, (ii) generate a cropped image of the target with surrounding margins, and (iii) send the cropped image to displacement analysis module 410.

According to some embodiments, image processing module 414 may be configured to enlarge the surrounding margins of a cropped image such as to ensure that the target will in fact be fully located within the cropped image. The degree of enlargement may be determined taking into account the inaccuracy level of the up-to-date system coordinates (i.e. a current coordinate system of the system).

Displacement analysis module 410 is configured to receive from recipe database 430 reference data corresponding to the target images and calibrate, if necessary, the reference data in accordance with up-to-date system coordinates. In particular, the calibration may include rescaling of the reference data coordinates. Displacement analysis module 410 is further configured to (i) use a pattern recognition method (e.g. image correlation) to compute a (maximum) matching score between the cropped image and corresponding (possibly rescaled) reference data, (ii) compare the matching score to a (pre-defined) threshold, and, if the matching score exceeds the threshold, (iii) compute displacements of each of the targets, based on the cropped images of the targets (and positions thereof in terms of the up-to-date system coordinates), received from image processing module 414, and the corresponding reference data. Hence, a target may be considered to have been "identified" when the computed matching score thereof is greater than the threshold.

According to some embodiments, during a scan, displacement analysis module 410 may send calibration data to controller 420 for runtime correction and/or adjustment of scanning parameters (at the beginning of a scan a new slice), such as an origin of a die-column, a scanning path, and so on. In particular, the calibration data may be used to update the system coordinates.

Figure 4B:
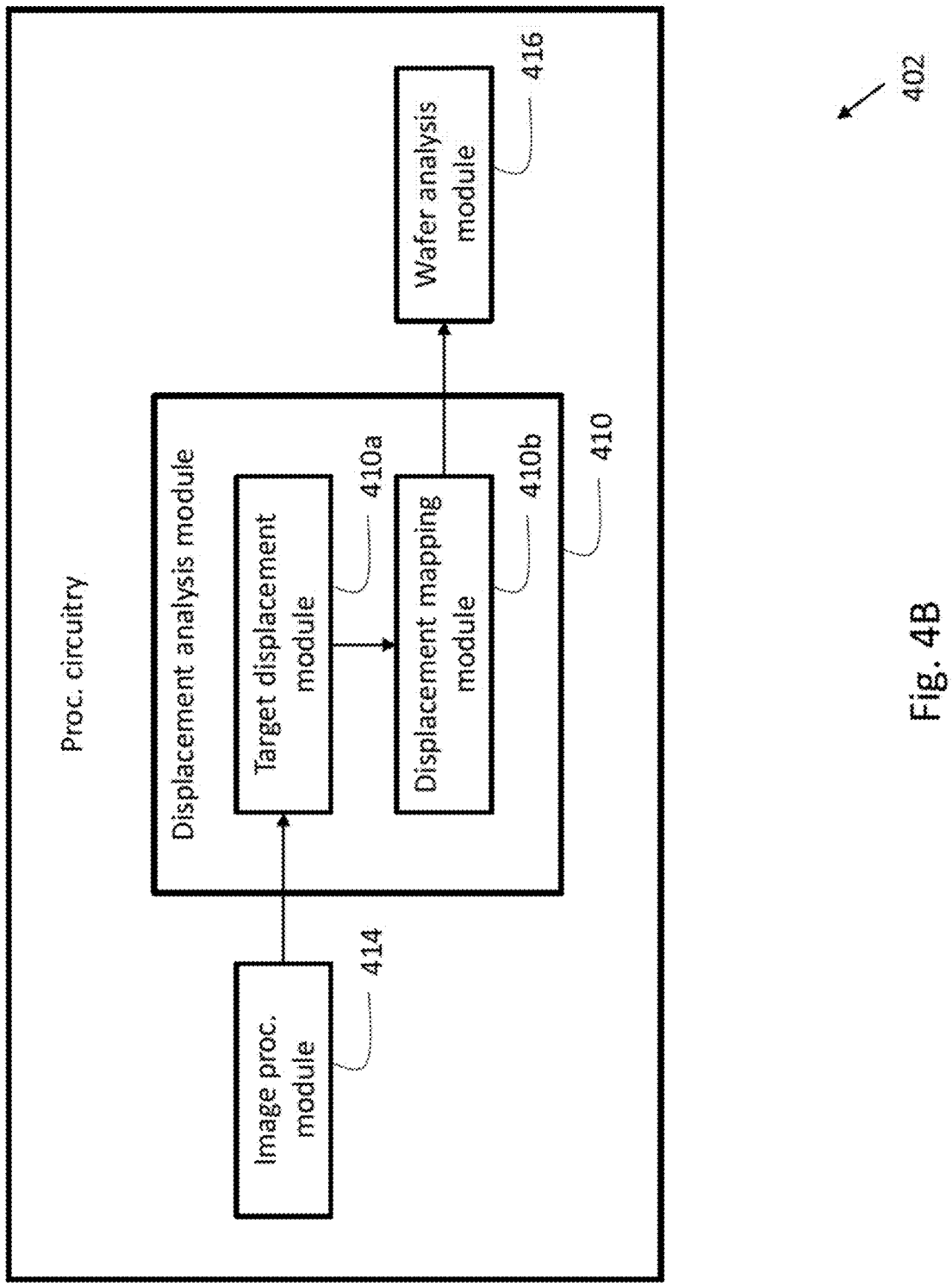
FIG. 4B is a block diagram of a displacement analysis module of the system of FIG. 4A, according to some embodiments.

According to some embodiments, and as depicted in FIG. 4B, displacement analysis module 410 may include a target displacement module 410a and a displacement mapping module 410b. Target displacement module 410a is configured to receive from image processing module 414 (cropped) images of targets located in a scanned wafer area. Target displacement module 410a is further configured to receive reference data corresponding to the targets (e.g. from recipe database 430). Target displacement module 410a may use the received images and reference data to compute displacements of the targets relative to the reference data positions thereof.

Displacement mapping module 410b is configured to receive from target displacement module 410a the computed target displacements. Displacement mapping module 410b is further configured to determine values of CTPs, based on the computed target displacements. Based on the determined values of the CTPs, displacement mapping module 410b may generate a high (spatial) resolution displacement mapping.

As explained below in the Methods subsection, the calibration data (pertaining to a wafer) generated by system 400 may be used to improve detection of potential defects on the wafer. In particular, the higher localization accuracy, afforded by the calibration data, allows to better associate analysis parameters and, more generally, analysis algorithms, with specific locations on the wafer. The calibration data may additionally be used to improve the reporting accuracy of positions of detected defects. Further, the calibration data may also be pertinent for tasks beyond defect detection, such as, for example, improving the positioning accuracy of a defect review tool or metrology tool, or another inspection apparatus (e.g. a SEM or a multi-beam inspection apparatus) used for inspecting a wafer.

Without limiting the scope of the disclosure in any way, according to some embodiments, system 400 may be used for process-diagnosis tasks. In particular, according to some embodiments, system 400 may be used for inspection tasks, in which a wafer, or one or more dies, are partially or fully scanned to detect potential defects. Additionally, or alternatively, according to some embodiments, system 400 may be used for review tasks wherein it is determined whether a potential defect is a defect of interest. Review tasks typically require higher-resolution scanning as compared to inspection tasks, and, as such, may utilize electron-beam inspection. Such review tools usually inspect small portions of a wafer at higher resolution (but lower throughput).

Whenever the term "inspection" or derivatives thereof are used in this disclosure, it will be understood that the inspection referred to is not limited with respect to resolution or size of inspected area(s). In particular, it will be understood that, according to some embodiments, system 400 may be applicable for review tools and lower resolution wafer inspection tools alike. The same will be understood to apply to the term "analysis", which, according to some embodiments, is used interchangeably with the term "inspection".

Figure 5A:
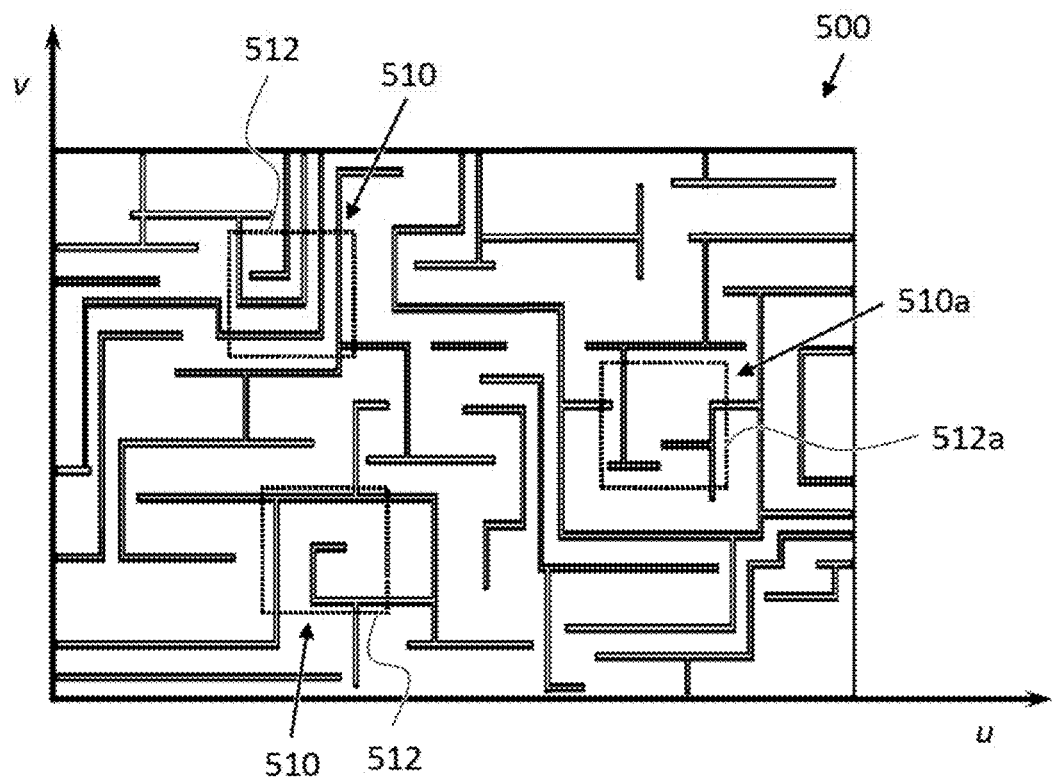
FIG. 5A schematically depicts an image frame of a scanned area on a die of a (patterned) wafer, according to some embodiments.

FIG. 5A schematically depicts an (image) frame 500 of a scanned area of a (patterned) die, such as area 110a, according to some embodiments. Frame 500 may contain anywhere between thousands to hundreds of millions of pixels. According to some embodiments, the width of the scanned area may correspond to the full width of the FOV of imager 424. According to some embodiments, the width of the scanned area may correspond to a part of the width of the FOV of imager 424.

Figure 5B:
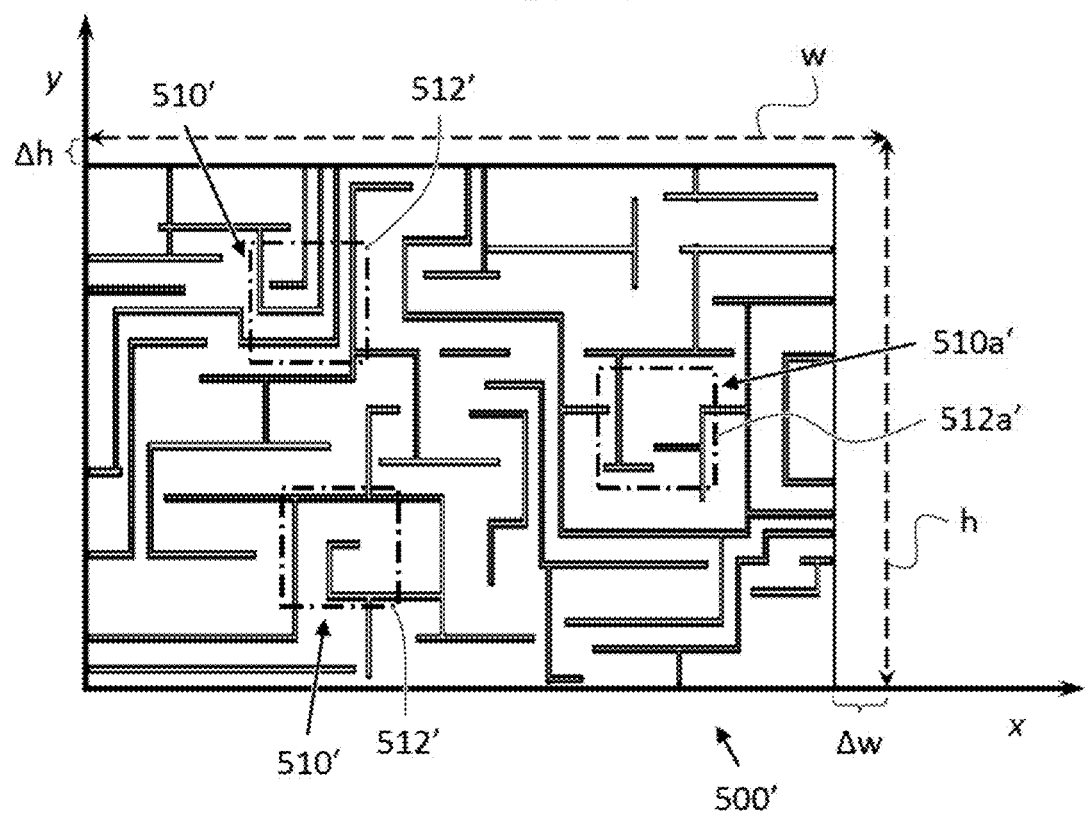
FIGS. 5B and 5C are schematic, graphical representations of reference data corresponding to the image frame of FIG. 5A, according to some embodiments.

FIG. 5B schematically depicts a reference image corresponding to the scanned area of FIG. 5A, according to some embodiments. As known in the art, a reference image may be obtained from corresponding reference data, such as design data, by mathematically transforming the reference data to generate a graphical representation thereof. More specifically, FIG. 5B schematically depicts a "reference data" (RD) area 500' corresponding to frame 500. RD area 500' is depicted as "shrunken", both along the x-axis and the y-axis, as compared to frame 500. RD area 500' may be generated using corresponding reference data and up-to-date system coordinates. The up-to-date system coordinates specify pixel widths and pixel heights, as estimated prior to the grabbing of frame 500.

A double-headed arrow w and a difference interval $\Delta$w indicate the contraction of RD area 500' along the x-axis. A double-headed arrow h and a difference interval $\Delta$h indicate the contraction of RD area 500' along the y-axis. While frame 500 is linearly expanded as compared to RD area 500', it is to be understood that this particular choice of variation (between frame 500 and RD area 500') is intended as a simple and straightforward example to facilitate the description and render the discussion more concrete.

As used herein, the term "reference data" should be expansively construed to cover any data indicative of the physical design of a (patterned) wafer and/or data derived from the physical design (e.g. through simulation, geometric and Boolean operations, and so on). According to some embodiments, the reference data of a wafer may include "design data" of the wafer, such as, for example, the various formats of CAD data. Design data can be provided in different formats, such as GDSII format, OASIS format, and the like.

According to some embodiments, reference data of a wafer may include data obtained by fully or partially scanning the wafer during recipe setup. Further, a first wafer fabricated to a certain design, may be scanned during recipe setup and the obtained scan(s) data may be processed to generate reference data, or additional reference data, for subsequently fabricated wafers of the same design (as the first wafer). Such "self-generated" reference data are imperative when design data are not available but may also be beneficial even when design data are available.

According to some embodiments, in generating the displacement mapping of an image frame, reference data of a wafer may be used in conjunction with data obtained in runtime. For example, scan data of one die, or multiple dies having the same architecture, during runtime may be used in generating the displacement mapping of another die of the same architecture, as elaborated on below.

Moreover, according to some embodiments, calibration data, generated with respect to a scanned first area, may be used in generating the displacement mapping for a scanned second area. In particular, in embodiments wherein the second area is scanned shortly (e.g. immediately) after the first area and is positioned close thereto (e.g. adjacently thereto along the same slice). For example, values of global shifts and constant skewing, determined with respect to the first area, may be used in generating the displacement mapping of the second area. Thus, the computational load involved in generating the CTPs of the second area is reduced (since the number of CTPs which have to be computed is reduced).

More specifically, reference data, or additional reference data—to be used, for example, in analyzing a plurality of wafers of a specific architecture—may be self-generated, e.g. by partially or fully scanning one or more sample wafers from the plurality. Image processing tools may be applied to the obtained scan(s) data to discover (or find) unique patterns which are "easy" to identify (detect) within a respective search area therearound. The discovered unique patterns (or more precisely, the images and the exact locations thereof) may be stored, e.g. in recipe database 430, for future use as reference data. As used herein, a pattern may be referred to as "unique" even when singular only along one axis (e.g. the x-axis or the y-axis). In particular, a pattern that that exhibits uniqueness only along one axis, for example, the x-axis, may still serve as reference data and may be used for x-axis calibration.

According to some embodiments, image processing module 414 and displacement analysis module 410 may be further configured for "self-generation" of reference data (in particular, the discovery of easy-to-identify registration targets) as described above, specifically, when design data are not available.

According to some embodiments, reference data may also include reference data pertaining to, or obtained from, other types of wafers (i.e. of a different architecture(s) than the wafers to be analyzed), but which are known to include patterns which are shared in common with the wafers to be analyzed.

Referring again to FIG. 5A, multiple frame targets 510 (i.e. targets imaged in frame 500) are schematically depicted and indicated within frame 500. Each of frame targets 510 is shown enclosed within a respective dotted box (e.g. of 32×32 pixels) from dotted boxes 512. For example, a frame target 510a (from frame targets 510) is enclosed within a dotted box 512a. Each of frame targets 510 may include a pattern which is comparatively easy to identify within its environment, e.g. by image processing module 414 (using suitable image processing algorithms).

Figure 5C:
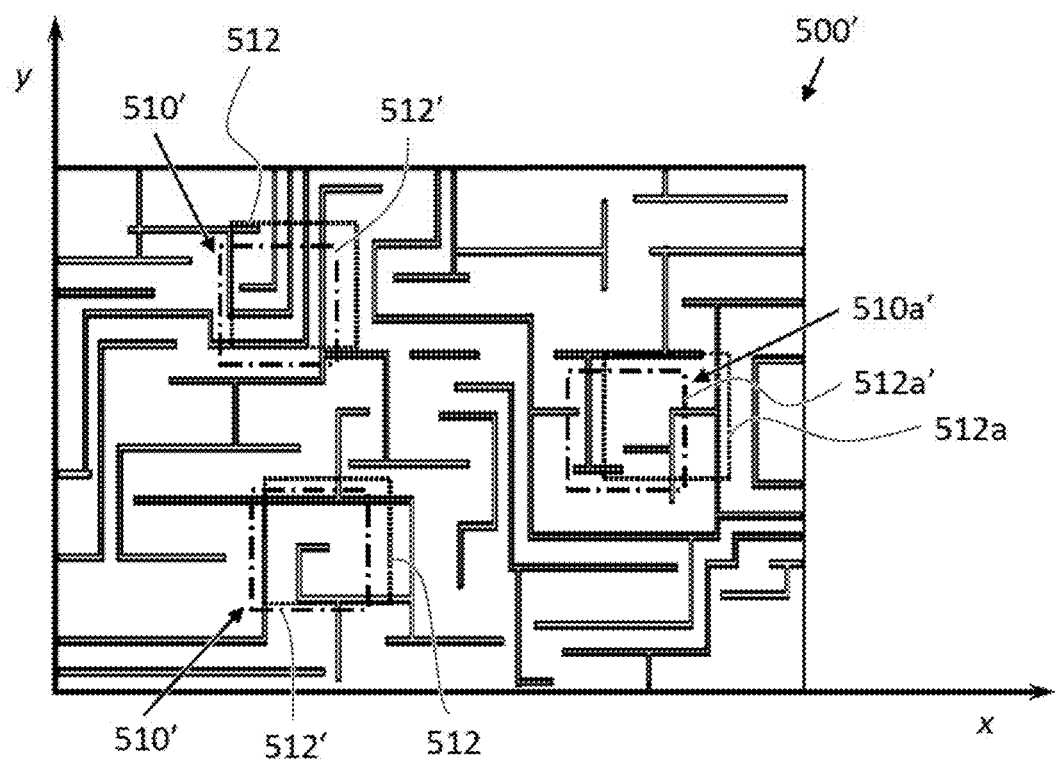

With each of frame targets 510 a corresponding RD target (from RD targets 510') in RD area 500' may be associated. RD targets 510' are shown in FIGS. 5B and 5C enclosed within dashed-dotted boxes 512'. For example, an RD target 510a' (from RD targets 510') is enclosed within a dashed-dotted box 512a'. FIG. 5C schematically depicts RD area 500' with dotted boxes 512 (which represent the locations of frame targets 510) superimposed thereon. The superimposition of dotted boxes 512 over RD area 500' visually illustrates the displacements of frame targets 510 relative to RD targets 510', respectively.

As a non-limiting example, and for the sake of clarity, all of frame targets 510 are shown as rectangular (i.e. dotted boxes 512 are rectangular), and of the same size. However, it will be understood that other options are also possible. According to some embodiments, frame targets may differ from one another in height and/or width. More generally, any shape constructed from pixels is in principle viable.

Displacement analysis module 410 (e.g. target displacement module 410a) is configured to compute displacements of each of frame targets 510 relative to a corresponding RD target (from RD targets 510'). According to some embodiments, displacement analysis module 410 may employ image registration methods, known in the art, to compute a displacement of each of frame targets 510, e.g. frame target 510a. For example, by maximizing over a cross-correlation coefficient of frame target 510a and RD target 510a' (which corresponds to frame target 510a).

The computed displacement of a (frame) target is indicative of the displacement of the target relative to where the target "should have been" according to the reference data. In other words, the computed displacement is indicative of the displacement of the target relative to where the target would have been in the absence of physical effects and imperfections.

It is noted that in implementations in which the format of the scan data (e.g. the format of the image frame) and the format of the reference data differ, intermediate processing of at least one of the formats may be required prior to performing image registration.

Additional details, and different ways whereby displacement analysis module 410 may perform image registration, are described below in the description of FIG. 7 and in the Methods subsection.

Figure 5D:
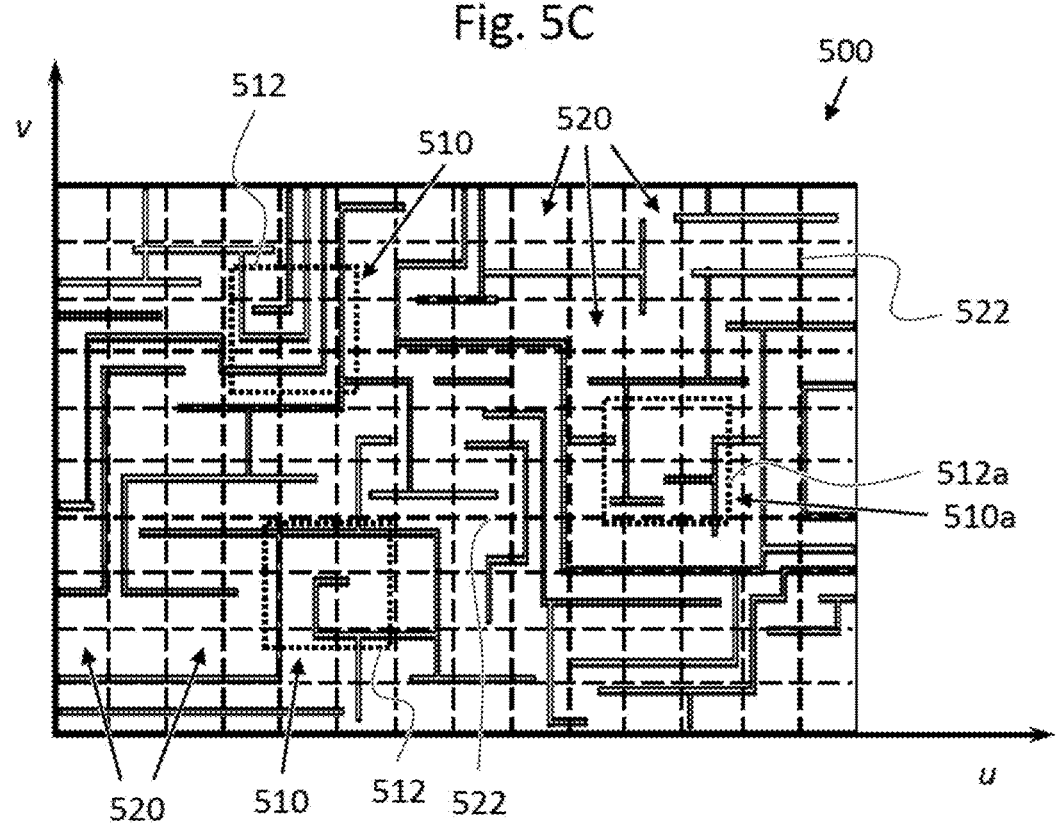
FIG. 5D schematically depicts the image frame of FIG. 5A partitioned into segments, according to some embodiments.

In FIG. 5D, frame 500 is shown partitioned (divided) into frame segments 520 (i.e. sub-images of frame 500), as indicated by dashed grid 522. According to some embodiments, frame segments 520 may differ from one another in size and/or shapes to account for various image deformations. According to some embodiments, each of frame segments 520 may correspond to a pixel. According to some embodiments, at least some or all of the segments may correspond to multiple pixels, such that all pixels in a segment share the same size and shape, in which case the partitioning of frame 500 into frame segments 520 may be executed by displacement analysis module 410.

Displacement analysis module 410 (e.g. displacement mapping module 410b) is further configured to generate a displacement mapping specifying a displacement for each of frame segments 520 (or at least some of frame segments 520), based on the computed displacements of frame targets 510. More specifically, displacement analysis module 410 is configured to use the computed displacements of frame targets 510 to obtain a coordinate transformation relating coordinates parameterizing frame 500 (i.e. u and v) to coordinates parameterizing RD area 500' (i.e. x and y). In other words, displacement analysis module 410 is configured to determine the values of each parameter C in a set of CTPs {C} parameterizing the coordinate transformation.

As a non-limiting example intended to render the discussion more concrete, in FIGS. 5A-5D, $u=(1+\alpha)\cdot x$ and $v=(1+\beta)\cdot y$ with $\alpha>0$ and $\beta>0$. The coordinate transformation can thus be characterized by the values of two parameters $\alpha$ and $\beta$ (i.e. $\{C\}=\{\alpha, \beta\}$). In particular, the scaling of the axes may differ (i.e. $\alpha \neq \beta$). That is, the pixel size along the wafer translation axis (i.e. the y-axis) may be determined by the stage motion, while the pixel size along the other axis (i.e. the x-axis) may be determined by the optical magnification.

It will be understood that generally either of $\alpha$ and $\beta$ may be negative. The setting of both $\alpha$ and $\beta$ as positive is purely so that the signs of $\alpha$ and $\beta$ correspond to expansion (rather than contraction), in agreement with FIGS. 5A-5D. With state-of-the-art wafer analysis systems, $\alpha$ and $\beta$ may typically be smaller than $10^{-3}$.

Various ways (e.g. fitting methods), in which the values of the CTPs may be obtained, are discussed in the Methods subsection.

Figure 5E:
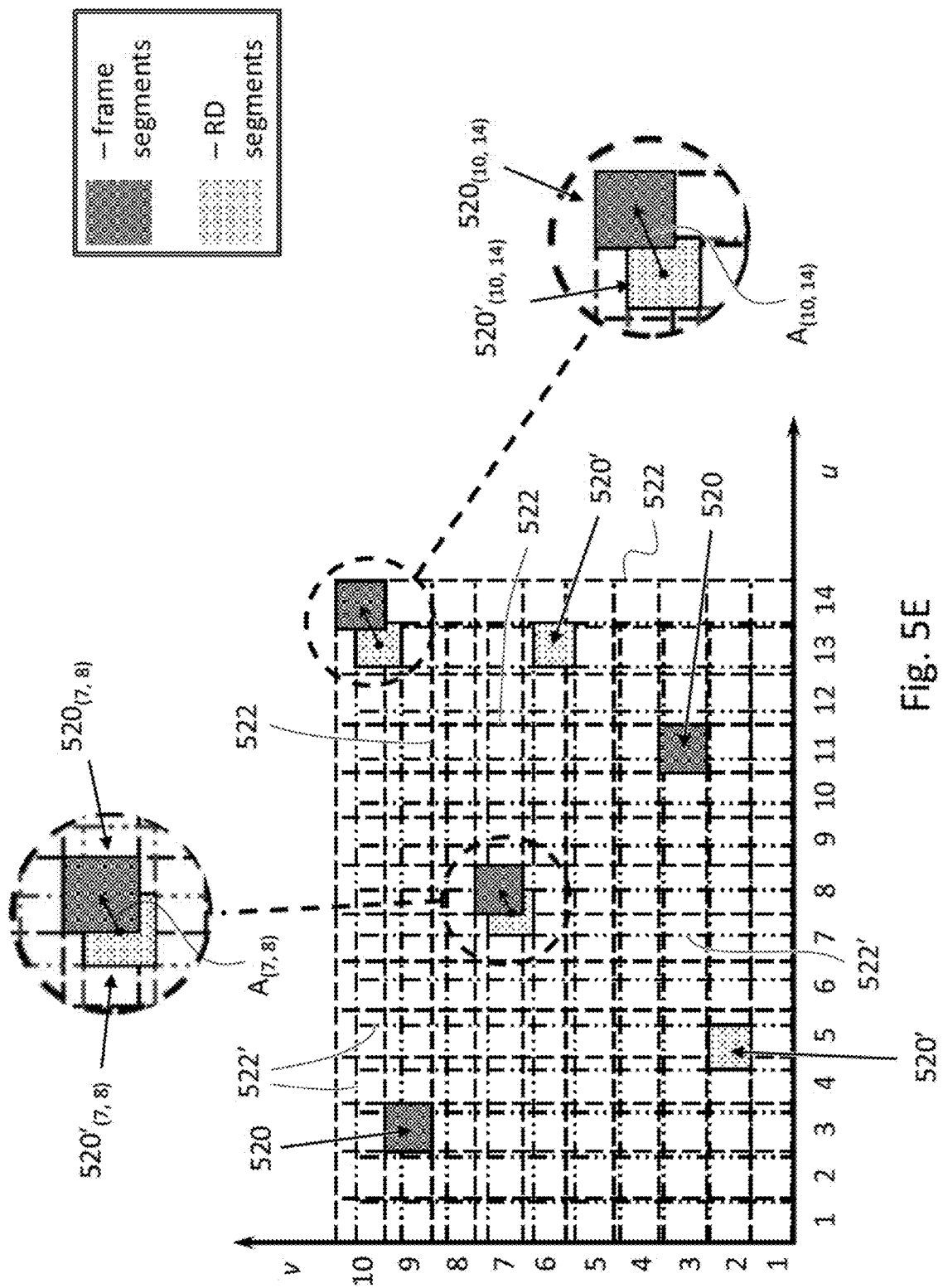
FIG. 5E is a graphical representation of a displacement mapping obtained from the coordinate transformation of FIGS. 5B and 5C, according to some embodiments.

FIG. 5E schematically depicts the displacement mapping corresponding to the above-specified coordinate transformation, according to some embodiments. Frame segments 520 are indicated by dashed grid 522. Further indicated are RD segments 520', which correspond to frame segments 520. That is, each of RD segments 520' may be obtained by applying the coordinate transformation to the corresponding segment from frame segments 520. RD segments 520' are indicated by a dashed double-dotted grid 522'. Some of frame segments 520 are "filled" by a first pattern to facilitate distinguishing thereof. Some of RD segments 520' are "filled" by a second pattern to facilitate distinguishing thereof.

According to some embodiments, the position of a segment may be specified by the "center of mass" coordinates of the segment. Thus, a frame segment $520_{(i,j)}$ (from frame segments 520) may be said to be positioned at the intersection of a first horizontal line (not indicated), which extends along the middle of the i-th row of frame segments 520, and a first vertical line (not indicated), which extends along the middle of the j-th column of frame segments 520. Similarly, a RD segment $520'_{(k,l)}$ (from RD segments 520') may be said to be positioned at the intersection of a second horizontal line (not indicated), which extends along the middle of the k-th row of RD segments 520', and a second vertical line (not indicated), which extends along the middle of the l-th column of RD segments 520'. The displacement of frame segment $520_{(i,j)}$ (i.e. relative to a corresponding RD segment $520'_{(i,j)}$) may be given by the corresponding displacement of the "center of mass": $\Delta x_i = u_i - x_i = \alpha \cdot x_i$ and $\Delta y_j = v_j - y_j = \beta \cdot y_j$.

Displacement arrows $A_{(7,8)}$ and $A_{(10,14)}$ illustrate the displacement of frame segments $520_{(7,8)}$ and $520_{(10,14)}$, respectively. Each of displacement arrows $A_{(7,8)}$ and $A_{(10,14)}$ points from the "center of mass" of the corresponding RD segment to the "center of mass" of the (frame) segment corresponding thereto.

Figure 6:
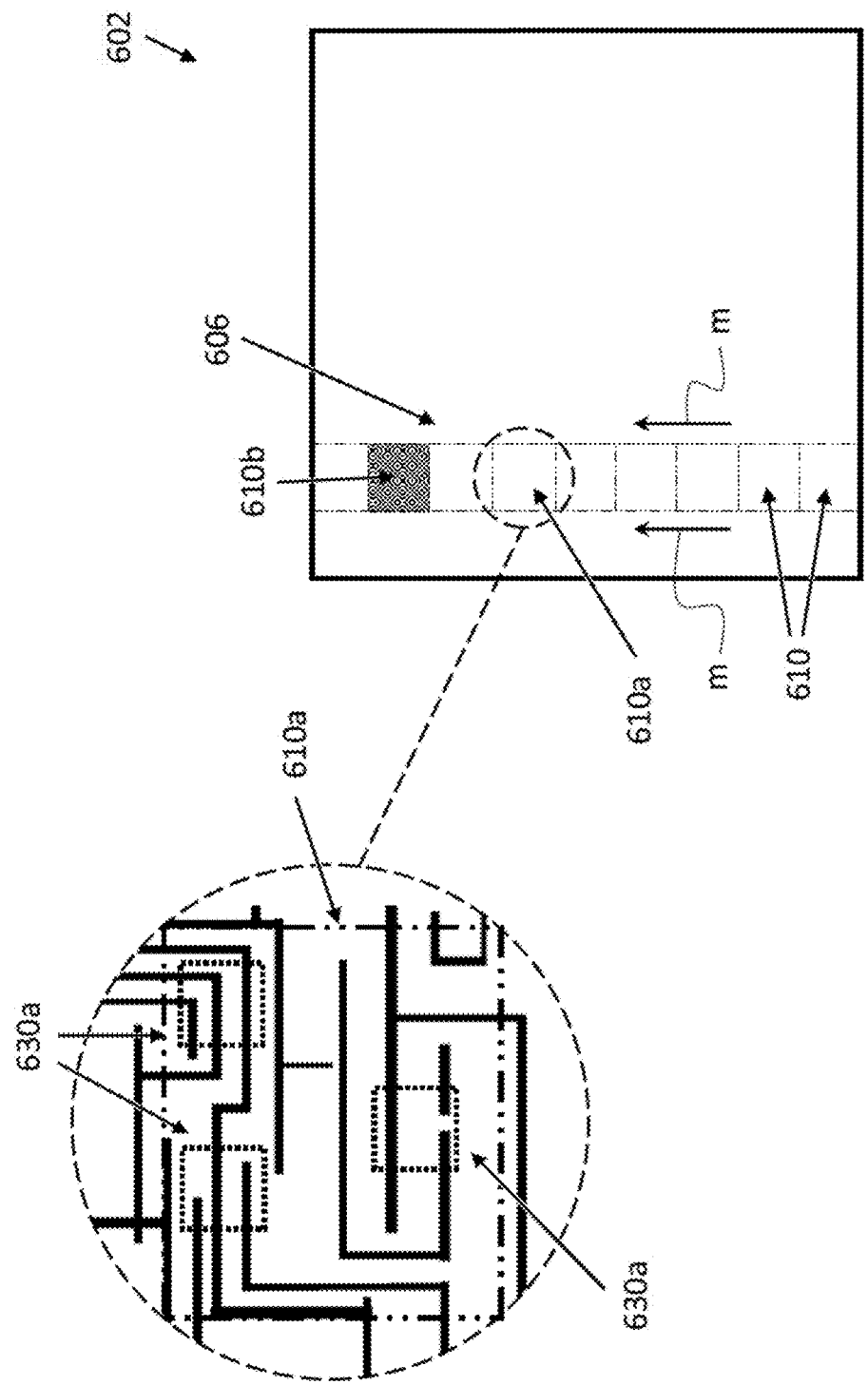
FIG. 6 schematically depicts a scanned slice extending through a die, according to some embodiments.

FIG. 6 depicts a die 602 (such as die 102a), according to some embodiments. A slice 606 of die 602 is also depicted, as well as adjacent areas 610 (such as areas 110) along the length of slice 606. Motion arrows m indicate the scanning direction (i.e. the motion direction of stage 422). A closeup view of an area 610a shows architecture thereof and targets 630a therein. System 400 is configured to generate displacement mappings of image frames pertaining to areas 610 by implementing the process described above in the description of FIGS. 5A-5E.

Also indicated is an area 610b. According to some embodiments, from the image frame, pertaining to area 610b, a displacement mapping at a required accuracy cannot be generated. According to some embodiments, this may be due to area 610b including an insufficient number of registration targets in the sense that the registration targets are too few to generate a displacement mapping at the required accuracy. Additionally, or alternatively, according to some embodiments, this may be due to the distribution of registration targets in area 610b possibly not being sufficiently uniform to generate a displacement mapping at the required accuracy (i.e. such that the displacements of all the frame segments are determined to the required accuracy).

According to some embodiments, in generating the displacement mapping corresponding to area 610b, displacement analysis module 410 may be configured to additionally take into account previously obtained calibration data (e.g. the sets of CTPs) corresponding to areas in slice 606 positioned near area 610b. In other words, displacement analysis module 410 may be configured to use extrapolation techniques, based on calibration data from other areas along slice 606, in generating the displacement mapping corresponding to area 610b.

According to some embodiments, in generating the displacement mapping corresponding to area 610b, displacement analysis module 410 may be configured to additionally take into account calibration data corresponding to all areas (or at least all areas, from whose image frames, displacement mappings at the required accuracy may be generated) along slice 606, and on die 602, scanned before area 610b.

According to some embodiments, in generating the displacement mapping corresponding to area 610b, displacement analysis module 410 may be configured to additionally take into account also calibration data corresponding to areas along slice 606 located on one or more previously scanned dies in the same die-column.

According to some embodiments, the calibration data (or at least the CTPs) corresponding to scanned areas may be temporarily stored in memory circuitry 404 (e.g. in a volatile memory component thereof). Displacement analysis module 410 (more specifically, displacement mapping module 410b) may be configured to request from memory circuitry 404 some or all of the saved CTPs and/or displacement mappings when tasked with generating a displacement mapping corresponding to an area including an insufficient number of registration targets. According to some embodiments, saved calibration data may be deleted from memory circuitry 404 once the saved calibration data are no longer of use for extrapolation and/or interpolation purposes. In particular, according to some embodiments, a saved CTP may be deleted after passage of a time interval which is greater than the characteristic timescale (coherence time) of the associated temporal physical effect(s) impacting the wafer or the setup (and parameterized by the CTP).

Optionally, according to some embodiments, the generation of the displacement mapping of area 610b may be delayed in order to also take into account calibration data of areas (from whose image frames displacement mappings at the required accuracy may be generated) along slice 606 scanned after area 610b. In other words, displacement analysis module 410 may further be configured to employ interpolation techniques—based on calibration data from areas along slice 606, above and below area 610b—in generating the displacement mapping of area 610b.

Figure 7:
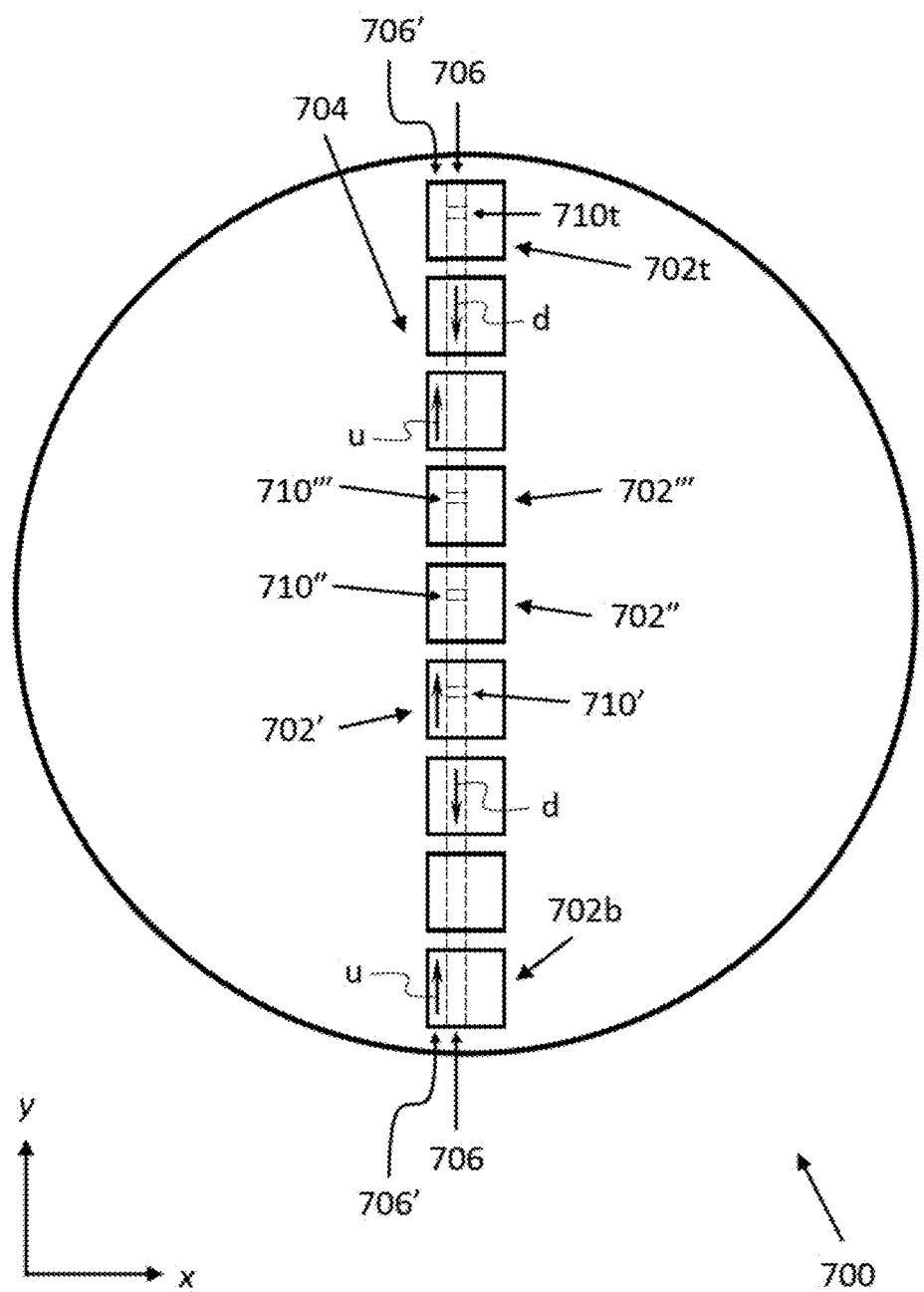
FIG. 7 schematically depicts adjacent slices along a die-column on a wafer scanned in alternating directions, according to some embodiments.

Referring also to FIG. 7, during a scan of a die-column on a wafer, the die-column may be scanned slice after slice in alternating directions (e.g. from the "bottom" of the wafer to the "top" thereof and from the top to the bottom), as indicated by arrows u an d. In the description of FIG. 7, terms, such as "top", "bottom", "above", "below", "right", and "left", should be understood in reference to the directions "defined" by the page of the figure (i.e. the page including FIG. 7). Thus, a first element may be said to be positioned above a second element when positioned closer to the top of the page as compared to the second element.

As discussed earlier, displacement analysis module 410 is configured to determine values of CTPs relating pairs of sets of coordinates: A first set of coordinates in a pair may parameterize an image frame of a scanned wafer area (i.e. an image frame pertaining to the scanned wafer area), while the second set of coordinates may serve as a "reference". According to some embodiments, the second set of coordinates (in a pair) may also parametrize a second image frame. The second image frame may be of a previously scanned wafer area (e.g. an area 710") which corresponds to the wafer area (e.g. an area 710') in the image frame parameterized by the first set of coordinates. In particular, the previously scanned wafer area (depicted in the image frame parametrized by the second set of coordinates) may be located in a die (e.g. a die 702") adjacent to the die (e.g. a die 702') that includes the wafer area depicted in the image frame parameterized by the first set of coordinates.

By way of example, dies 702' and 702" are adjacent and located along a slice 706 of a die-column 704 of a wafer 700 (such as wafer 100). Up to imperfections, dies 702' and 702"

share the same architecture. Slice 706 is shown scanned from top to bottom (as indicated by arrows d). Area 710' and area 710" are "corresponding" areas in the sense of sharing the same architecture up to imperfections. Area 710" is scanned prior to area 710'.

According to some embodiments, the coordinate transformation is determined by identifying targets in an image frame pertaining to area 710' and computing the displacements thereof relative to the positions of corresponding targets in an image frame pertaining to area 710" (e.g. by maximizing over correlation coefficients of the images of the targets, as explained above). Based on the computed target displacements, the values of the CTPs are determined. The CTPs may then be used to obtain displacements of multiple segments in the image frame pertaining to area 710' relative to the corresponding positions thereof in the image frame pertaining to area 710", thereby generating a displacement mapping of the image frame pertaining to area 710'.

The obtained coordinate transformation is configured to account for physical effects and imperfections, both temporal and permanent, which are manifested as variations between the image frames pertaining to areas 710" and 710'. The image frame pertaining to area 710" is thus used to generate the displacement mapping corresponding to area 710'. Similarly, the image frame pertaining to an area 710''', which corresponds to area 710", may be used to generate the displacement mapping corresponding to area 710". Area 710''' is located (on slice 706) on a die 702''', which is positioned adjacently to die 702" and above thereto on die-column 704.

Conversely, in a slice scanned from the bottom of die-column 704 to the top thereof, such as a slice 706', which is the leftmost slice in die-column 704, image frames pertaining to areas on die 702' may be used to generate the displacement mappings pertaining to corresponding areas on die 702", and image frames pertaining to areas on die 702" be used to generate the displacement mappings pertaining to corresponding areas on die 702'''.

Finally, the coordinate transformations pertaining to "first scanned" areas along a slice (i.e. areas in the bottom die when the slice is scanned from the bottom to the top or areas in the top die when the slice is scanned from the top to the bottom), may relate the coordinates parametrizing the image frames of the (first scanned) areas to coordinates parameterizing reference data (such as design data of the first scanned areas). For example, the CTPs of a first scanned area 710t (which corresponds to areas 710', 710", and 710''') in a top die 702t in die-column 704 may relate the image frame thereof to reference data thereof.

According to some embodiments, wherein wafer analysis module 416 is, or includes, a defect detection module, wafer analysis module 416 may be configured to take into account the generated displacement mappings (relating the coordinates of image frames of corresponding areas), for example, as part of a die-to-die (D2D) or a cell-to-cell (C2C) defect detection protocol. Further, wafer analysis module 416 may be configured to apply specific defect detection algorithms to respective subframes within an image frame in accordance with the generated displacement mappings.

Alternatively, according to some embodiments, displacement analysis module 410 may be configured to determine sets of CTPs directly relating the sets of coordinates of image frames of all corresponding areas along a slice (e.g. areas 710', 710", and 710''' and the rest of the corresponding areas along slice 706) to a common (and single) set of coordinates. The common set of coordinates may parameterize reference data, such as design data (which, since the areas correspond to one another, is common to all the areas). The reference data may be stored in a recipe database, such recipe database 430. According to some such embodiments, wherein wafer analysis module 416 is, or includes, a defect detection module, wafer analysis module 416 may be configured to take into account the displacement mappings—which have been generated relative to a common set of coordinates)—as part of a die-to-database (D2DB) defect detection protocol. Further, wafer analysis module 416 may be configured to apply specific defect detection algorithms to respective subframes within an image frame in accordance with the generated displacement mappings.

Additionally, according to some embodiments, one or more of the CTPs, associated with non-transient effects, such as a fixed offsetting of the stage translation direction, may be "carried over" from a scanned slice to a subsequently scanned slice(s), thereby potentially improving the accuracy.

According to some embodiments, the two above-described approaches to generating displacements mappings (i.e. via a die-to-die or cell-to-cell comparison, or via a die-to-database comparison) may be combined. For example, according to some such embodiments, some CTPs may relate coordinates respectively parameterizing two image frames, both obtained in runtime, and other CTPs may relate a respective image frame (in particular, of an area of a mid-die in the die-column), obtained in runtime, to respective reference data, such as design data.

As a non-limiting example, it is assumed that a (first) distance between die 702' and bottom die 702b is equal to a (second) distance between die 702" (which is adjacent to die 702') and top die 702t. That is, the number of dies between die 702' and bottom die 702b is assumed to be equal to the number of dies between die 702" and top die 702t. Displacement mappings of image frames pertaining to areas in die 702' and bottom die 702b along slices scanned from bottom-to-top (e.g. slice 706') may be generated using reference data, such as design data. Displacement mappings of image frames pertaining to areas in the rest of the dies in die column 704—along these same slices (i.e. scanned from bottom-to-top)—may be generated based on image registration relative to corresponding image frames pertaining to previously scanned areas in one or more dies positioned below thereto.

For example, CTPs of image frames of areas in die 702", along slices scanned from bottom-to-top, may be generated based on image registration relative to corresponding image frames of previously scanned areas in die 702'. And CTPs of image frames of areas in die 702''', along slices scanned from bottom-to-top, may be generated based on image registration relative to corresponding image frames of previously scanned areas in die 702". Similarly, CTPs of image frames of areas in each die positioned between bottom die 702b and die 702', along slices scanned from bottom-to-top, may be generated based on image registration relative to corresponding image frames of previously scanned areas in a respective adjacent die positioned below thereto.

It is noted that for each of the image frames pertaining to areas in die 702', along slices scanned from bottom-to-top, the displacements of the (frame) targets are computed relative to positions thereof as given by reference data of the respective area (possibly after rescaling of the reference data based on up-to-date system coordinates). In contrast, for each of the image frames pertaining to areas in die 702", along slices scanned from bottom-to-top, the displacements of the (frame) targets are computed relative to calibrated positions of corresponding (frame) targets in image frames pertaining to previously scanned areas in die 702'. Nevertheless, it is emphasized that not only in the former case but also in the latter case the reference data is taken into account in computing the target displacements (and, hence, the displacement mappings), since the calibrated positions (with respect to which the target displacements are computed)—in the above example—are (directly) computed based on the reference data (up to rescaling). Thus, a displacement mapping of an image frame pertaining to die 702″—which is generated based on computed displacements of (frame) targets (in the image frame) relative to calibrated positions of corresponding (frame) targets within a corresponding image frame pertaining to die 702′—may be said to be derived from reference data.

Similarly, a displacement mapping of an image frame pertaining to die 702′″—which is generated based on computed displacements of (frame) targets (in the image frame) relative to calibrated positions of corresponding (frame) targets within a corresponding image frame pertaining to die 702″—may be said to be derived from reference data. Since the calibrated target positions—with respect to which the displacements of targets (in the image frame pertaining to die 702′″) are computed—are themselves derived from reference data, as explained in the preceding paragraph.

More generally, target displacements, computed relative to calibrated positions of corresponding targets, may be said to be derived from reference data. Similarly, CTPs and displacement mappings generated based on target displacements, computed relative to calibrated positions of corresponding targets, may be said to be derived from reference data.

Generally, in any "chain" (i.e. sequence) of displacement mappings generated based on registering image frames with respect to one another, the displacement mapping of the "first" image frame in the chain may be generated based on reference data. Thus, all the displacement mappings may be said to be derived from the reference data. The displacement mapping of the first image may be said to be directly generated (obtained) from the reference data. The displacement mappings of the rest of the frames may be said to be indirectly generated from the reference data, as computation of inter-image registrations is involved.

Continuing with the description of FIG. 7, displacement mappings of image frames pertaining to areas in die 702″ and top die 702*t*, along slices scanned from top-to-bottom, (e.g. slice 706) may be generated using reference data, such as design data. Displacement mappings of image frames pertaining to areas in the rest of the dies in die column 704—along these same slices (i.e. scanned from top-to-bottom)—may be generated based on image registration relative to corresponding image frames pertaining to previously scanned areas in one or more dies above thereto.

For example, CTPs of image frames pertaining to areas in die 702′, along slices scanned from top-to-bottom, may be generated based on image registration relative to respective corresponding image frames of previously scanned areas in die 702″. Similarly, CTPs of image frames of areas in each die positioned between bottom die 702*b* and die 702″, along slices scanned from top-to-bottom, may be generated based on image registration relative to corresponding image frames of previously scanned areas in a respective adjacent die positioned above thereto.

It is noted that the accuracy of a displacement mapping of an image frame, generated based on a chain of displacement mappings—each of which having been generated using calibration data of corresponding and previously scanned areas along a slice—may decrease with the length of the chain. On the other hand, direct generation of a displacement mapping from reference data may be comparatively computationally more costly, when considering that when the displacement mappings are generated as part of e.g. a defect inspection protocol, die-to-die or cell-to-cell image registrations are implemented by default (that is, in any case) for the purposes of defect detection.

Thus, according to some embodiments, in order to balance the above considerations (and at the same time achieve a required or desired accuracy), every pre-determined number of dies, the displacement mappings of image frames of the next die (to be scanned) may be directly generated from reference data (such as design data), while the displacement mappings of image frames of the rest of the dies may be generated based on image registration relative to corresponding image frames from a respective previously (and potentially adjacent) scanned die.

Methods

Figure 8:
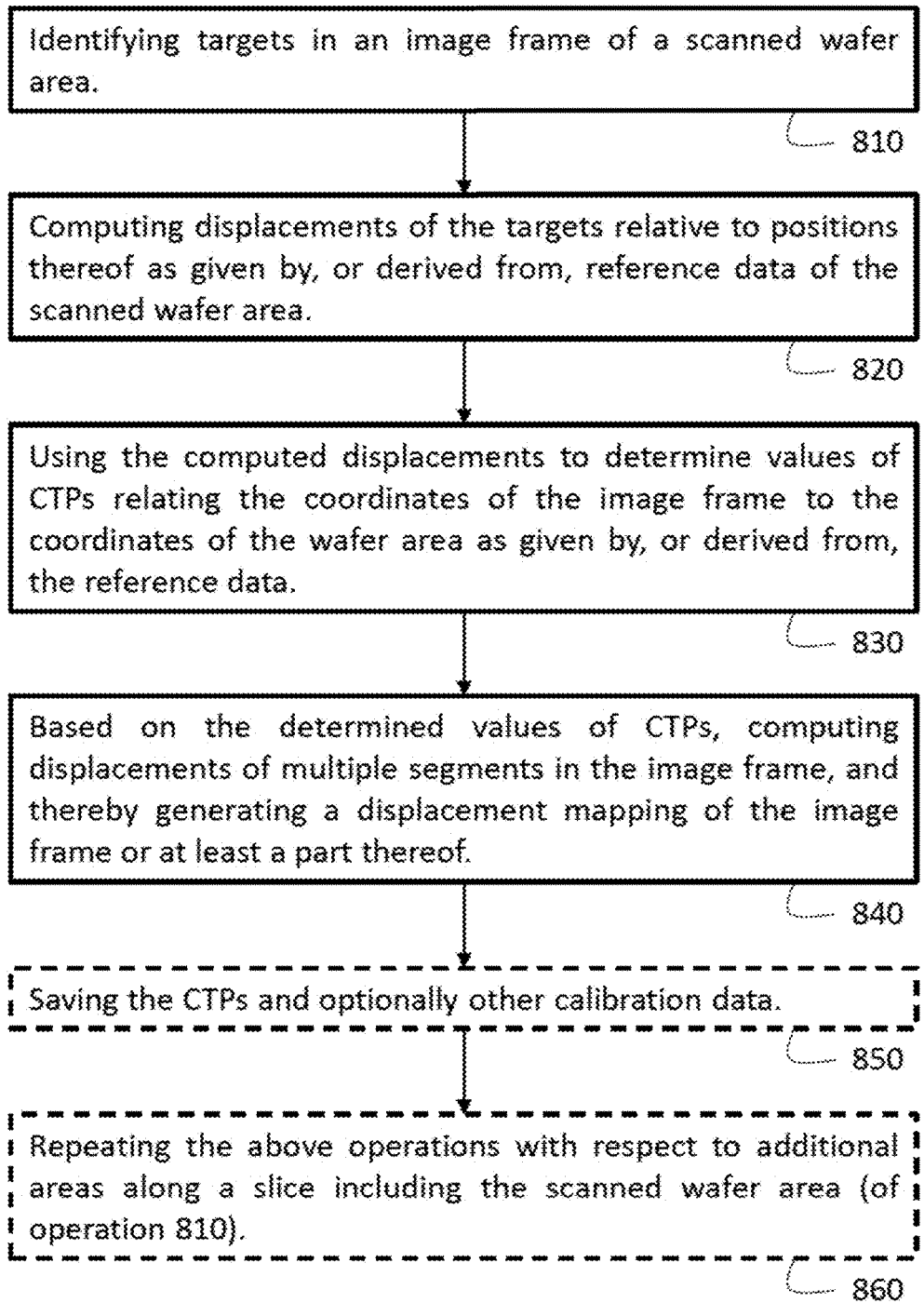
FIG. 8 presents a flowchart of a coordinate transformation-based method for generating calibration data for wafer analysis, according to some embodiments.

FIG. 8 presents a flowchart of a computerized method 800 for generating calibration data usable for wafer analysis, according to some embodiments. Method 800 may be implemented using a system configured for generating calibration data usable for wafer analysis, such as system 400.

According to some embodiments, method 800 includes:

An operation 810, wherein (frame) targets are identified in an image frame (e.g. frame 500) of a first area (e.g. area 110*a*) on a die of a wafer (e.g. wafer 100). The targets may be identified using corresponding reference data.

An operation 820, wherein displacements of the targets (i.e. the images of the targets in the image frame) relative to positions of corresponding targets, as given by, or derived from, the reference data of the targets, are computed.

An operation 830, wherein values of CTPs, relating the coordinates of the image frame to the coordinates of the reference data, are determined based at least on the target displacements computed in operation 820.

An operation 840, wherein (at least) the determined values of the CTPs are used to obtain displacements of multiple segments (e.g. pixels) in the image frame, thereby generating a displacement mapping of the image frame or at least a part thereof An optional operation 850, wherein the CTPs, and, optionally, other obtained calibration data, may be saved.

An optional operation 860, wherein operations 810 to 850 are serially repeated with respect to (image frames of) additional areas. The areas may be positioned along a slice extending through a die.

Operation 810 may be implemented by an image processing module, such as image processing module 414 or similar thereto. Each of operations 820, 830, and 840, may be implemented by a displacement analysis module such as displacement analysis module 410 or similar thereto. In particular, according to some embodiments, operation 820 may be implemented by a target displacement module such as target displacement module 410*a* or similar thereto. According to some such embodiments, operations 830 and 840 may be implemented by a displacement mapping module, such as displacement mapping module 410*b* or similar thereto.

Each of the targets to be identified in operation 810 may (i) constitute a unique pattern within the environment thereof along either or both of the x-axis and the y-axis, and (ii) exhibit high-contrast along either or both of the x-axis and the y-axis. The targets to be identified may be specified by a scanning recipe. The scanning recipe may include identification information for each of the targets. The identification information, associated with a target, may be a cropped image of the target obtained during a recipe setup, multiple representative cropped images of the target, a CAD-simulated image, or other parameterized values of image pattern recognition properties, which may be used for identification purposes. The identification information may be stored in a (scanning) recipe database, such as recipe database 430.

On the one hand, the greater the number of registration targets employed in operation 810, the greater the induced noise suppression (i.e. the averaging-out of temporal and/or local measurement noise), and so the more accurate the determination of the CTPs and the displacement mappings in operations 830 and 840, respectively. On the other hand, the greater the number of registration targets employed in operation 810, the greater the computational load, so that delays in scanning may be incurred, leading to lower throughput, and/or additional computational resources may be necessitated. Thus, according to some embodiments, when a die, or one or more areas thereon, are characterized by a high density of registration targets, only a subset of the registration targets may be employed in operation 810 (so long as the subset suffices to attain the required accuracy). The number and choice of registration targets (to be used in operation 810) may be determined during the recipe setup.

In operation 820, prior to computing the displacements, the reference data may be calibrated based on up-to-date systems coordinates. In particular, reference data coordinates may be rescaled in accordance with the up-to-date system coordinates.

According to some embodiments, in operation 820, the displacements of the targets (i.e. images of the targets in the image frame) may be computed to sub-pixel precision. For example, using image correlation techniques, correlation coefficients between an image of a target and a reference image thereof (obtained from reference data describing the target) may be respectively computed per relative shift between the two images. The sub-pixel displacement may then be obtained by interpolating over the correlation coefficients and taking the maximum. If the format of the scan data differs from that of the reference data, intermediate processing of at least one of the two may be required prior to computing the correlation coefficients.

According to some embodiments, in operation 820, the displacement of the targets may be obtained by computing the displacement of the targets relative to respective positions thereof as specified by reference data (possibly after rescaling), in which case, the displacements (and consequently the CTPs and the displacement mapping) may be said to be directly obtained from the reference data. According to some embodiments, the displacements of the targets may be obtained by computing the displacement of the targets relative calibrated positions of corresponding targets in a corresponding image frame, in which case the displacements (and consequently the CTPs and the displacement mapping) may be said to be indirectly obtained (or derived) from the reference data, as described above with respect to chains of displacement mappings (in the description of FIG. 7).

In operation 830, the extraction of the CTPs {C} from the computed target displacements, may be executed using fitting methods (optimization algorithms) known in the art, such as least squares regression, the Nelder-Mead downhill simplex method, and the like, which minimize the difference between the computed target displacements and corresponding displacements as specified by "trial" coordinate transformations. In this regard, it is noted that fast fitting methods have the advantage of not decreasing the inspection tool throughput. Prior to analyzing a new type of wafer (e.g. with different die geometry and different pattern types), a different set of CTPs may be selected in order to optimize the computation time while satisfying accuracy requirements. (Typically, the accuracy requirements reflect the intricacy and complexity of the patterns on a wafer.) Generally, the aim is to reach a minimum set of significant CTPs for which the associated errors are within the required accuracy.

According to some embodiments, the CTPs correspond to linear coordinate transformations of the form:

$$x \rightarrow u = T_x + S_x \cdot (x - x_c) + \Phi_x \cdot y,$$

$$y \rightarrow v = T_y + S_y \cdot (y - y_c) + \Phi_y \cdot x.$$

Here, $T_x$ and $T_y$ parameterize global translations along the x and y axes, respectively, $S_x$ and $S_y$ parameterize linear scaling along the x and y axes, respectively, and $\Phi_x$ and $\Phi_y$ parameterize x and y skewing, respectively. Since $\Phi_x$ and $\Phi_y$ are constant (i.e. do not depend on the coordinates within the image area), the skewing, described by the above coordinate transformation, is uniform (at a fixed angle). Any rotation about an axis parallel to the z-axis can be "absorbed" into $\Phi_x$ and/or $\Phi_y$ when restricting to sufficiently small angles (i.e. when restricting to first order in x and y). Hence, no rotation coefficient appears in the above equations. The coordinates x and y are reference coordinates, i.e. parameterize the RD area corresponding to the image frame, while the coordinates u and v parameterize the image frame. $x_c$ and $y_c$ label the center of the RD area.

It is noted that the choice of CTPs may be dependent on the dimensions (e.g. the height) of the image frame, for which the displacement mapping is to be generated. More specifically, the larger the dimensions of the image frame, the more complex the coordinate transformation (relating the displacement of frame segments to reference data positions thereof) may be, so that the number of CTPs necessary to attain a required (or desired) accuracy may commensurately increase.

The size of the segments may be determined according to the desired (spatial) resolution of the image frames. Each segment may include a plurality of pixels. When maximal resolution is required, each segment will correspond to a single pixel. According to some embodiments, the lower the required resolution, the lower the required accuracy of the displacement mappings, implying that the displacements of comparatively fewer targets can be computed and/or fewer CTPs can be employed in generating the displacement mappings.

According to some embodiments, the set of CTPs may include additional parameters (beyond the six listed in the equations above). In particular, according to some embodiments, the set of CTPs may include any parameter associated with a continuous transformation, which may contribute in accounting for the displacements of segments throughout an image frame relative to reference data positions thereof. According to some embodiments, in order to further reduce residuals, the significance of a specific CTP may be assessed using design-of-experiment methods or other methods such as machine learning-based methods. The option of incorporating additional parameters, in order to meet accuracy requirements or further reduce residuals, reflects the flexibility of the disclosed method.

According to some embodiments, the width of the image frame corresponds to, or is included in, a FOV of an imager, such as imager 424. In particular, the width of an image frame may correspond to only a part of the FOV of the imager. That is, an image frame may depict a scanned area whose width is smaller than the width of the scanned slice in which the scanned area is included. According to some embodiments, each of the segments of the image frame corresponds to a single pixel.

According to some embodiments, in operation 860, for a given m, wherein m is an integer greater than one, the m-th repetition may be implemented with respect to an (m+1)-th area adjacent to an m-th area with respect to which the (m−1)-th repetition was implemented. According to some embodiments, at least some of the areas in operation 860 may overlap.

According to some embodiments, e.g. wherein method 800 includes operation 860, method 800 may further include an operation wherein the number of image frames pertaining to a slice on a die is pre-determined in order to meet a desired criterion (e.g. a required accuracy of the displacement mappings). Fixing of the number of image frames is equivalent to determining the height(s) of the image frames. As mentioned above, the higher the required accuracy, the greater the number of CTPs which may be necessary in order to generate the displacement mapping at the required accuracy. In particular, a greater accuracy may necessitate taking into account additional CTPs characterized by shorter coherence times, which may accordingly limit the height of the image frames (so that the correlations exhibited by the additional CTPs persist across the full y-dimension of each image frame). According to some embodiments, the height(s) of the image frames, together with the choice of CTPs, may be optimized such as to attain a required accuracy of the displacement mappings at maximum throughput.

Method 800 may be repeated with respect to additional slices, such as to scan one or more regions of a wafer or to fully scan the wafer.

According to an aspect of some embodiments, method 800 may be implemented as part of a process-diagnosis task such as wafer inspection, metrology, and/or review.

According to an aspect of some embodiments, there is provided a wafer analysis method. The wafer analysis method may include, for example, determining the presence of potential defects on a wafer or review of potential defects in a provided list of potential defects. The wafer analysis method is performed taking into account calibration data generated according to method 800. In other words, the method includes method 800. The method may be implemented using a system such as system 400. In particular, the generation of calibration data from obtained scan data may be performed using a displacement analysis module, such as displacement analysis module 410 (as well as an image processing module, such as image processing module 414). The analysis may be performed using a wafer analysis module, such as wafer analysis module 416.

It is noted that the disclosed methods may be applied at any stage of a wafer fabrication process, wherein an imager is able to discern a pattern on the wafer.

Figure 9:
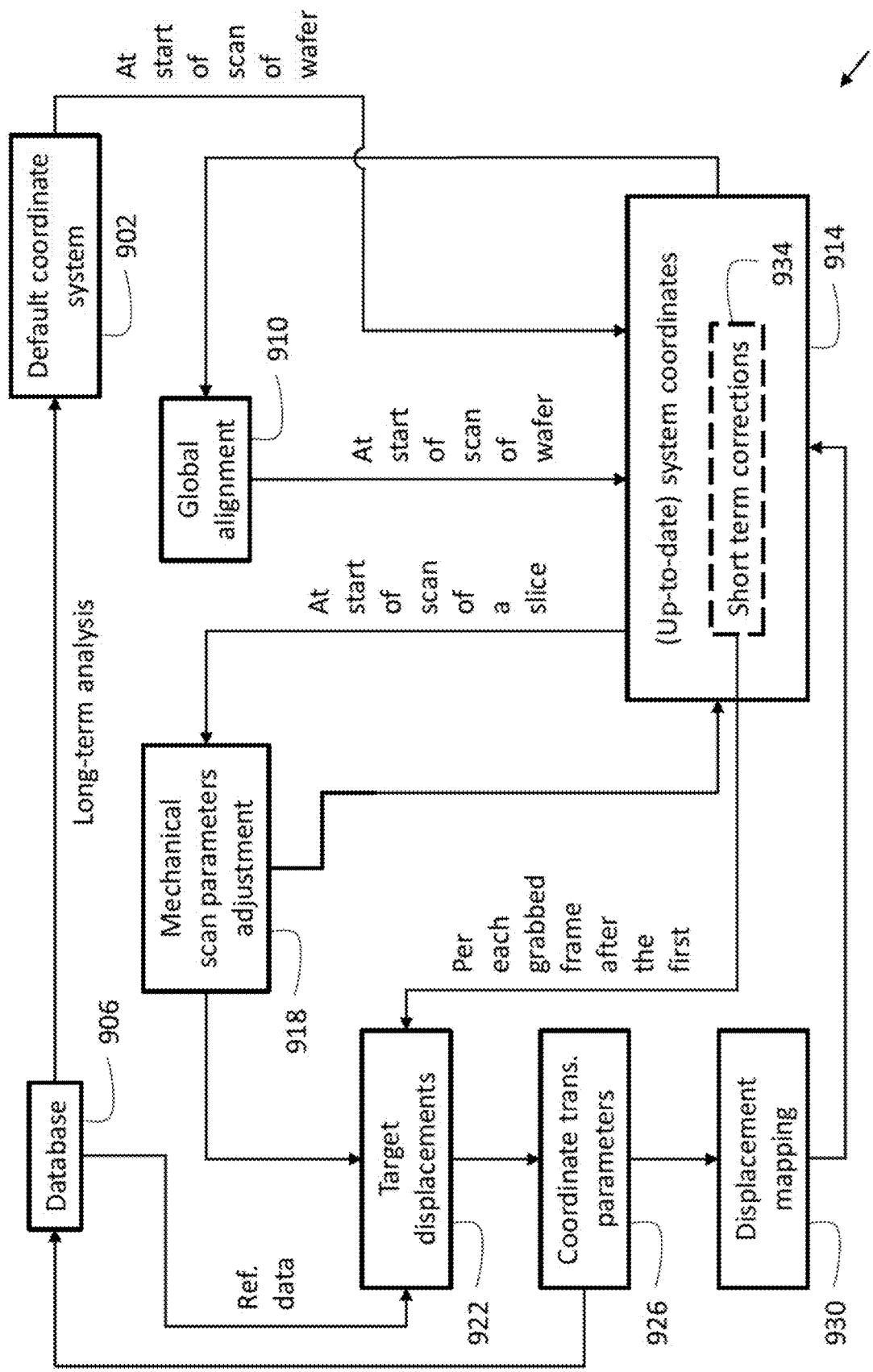
FIG. 9 presents a flowchart illustrating run-time calibration of system coordinates during a scan of a wafer using the computerized systems and methods of the present disclosure, according to some embodiments.

FIG. 9 presents a flowchart 900 illustrating calibration (i.e. updating) of system coordinates (i.e. the system's coordinate system) during a scan of a wafer implemented using a system, such as system 400, in accordance with method 800, according to some embodiments. At the start of a scan of a wafer, or one or more regions thereof, a default coordinate system 902 is employed, which serves as an initial coordinate system for the wafer. Default coordinate system 902 may be stored in a database 906, such as recipe database 430.

Default coordinate system 902 may be sent to an alignment module of the system. The alignment module may utilize default coordinate system 902, in an operation 910, to align the wafer with respect to the axes of a stage (e.g. stage 422), whereon the wafer is placed (such that the die-columns are parallel to the translation direction of the stage during a scan). By modifying default coordinate system 902 to take into account the alignment of the wafer, up-to-date system coordinates 914 are generated. System coordinates 914 are repeatedly updated during the scan of the wafer, as described below.

Prior to commencing the scan, in an operation 918, mechanical scan parameters—dictated by the scanning recipe and initially specified with respect to default coordinate system 902—may be adjusted in accordance with up-to-date (i.e. current) system coordinates 914. The mechanical scanning parameters may specify, for example, the scanning path. More generally, operation 918 is repeatedly performed at the start of the scan of each slice, as elaborated on below.

The scanning of each slice may be implemented as described above in the description of method 800 and in the description of FIG. 6. Per each resolvable grabbed (image) frame, target displacements 922 are computed. According to some embodiments, target displacements 922 may be computed by a processing circuitry, such as processing circuitry 402, using reference data from database 906. That is, by computing the displacement of each identified target (e.g. frame target 510a) in the grabbed frame relative to the position thereof as specified by the reference data (e.g. RD target 510a') and up-to-date system coordinates 914. In particular, the RD area (e.g. RD area 500') corresponding to the grabbed frame (e.g. image frame 500) may be localized and aligned with respect to up-to-date system coordinates 914. The targets may be identified by an image processing module, such as image processing module 414. Target displacements 922 may be computed by a displacement analysis module, such as displacement analysis module 410, and, more precisely, by a target displacement module, such as target displacement module 410a.

According to some alternative embodiments, for a given grabbed frame of a last scanned area, at least some of target displacements 922 may be computed based on a (corresponding) calibrated frame of an earlier scanned area. The earlier scanned area may be of the same design as the last scanned area. In particular, according to some embodiments, the earlier scanned area may be positioned along the same slice as the last scanned area but on an adjacent die to the die including the last scanned area.

Next, target displacements 922 are employed to compute CTPs 926, using a displacement analysis module, such as displacement analysis module 410, and, more precisely, using a displacement mapping module, such as displacement mapping module 410b. CTPs 926 are then utilized to generate a displacement mapping 930 of the grabbed frame.

CTPs 926 and/or displacement mapping 930 may be used to update system coordinates 914. According to some embodiments, the updating may include short term corrections 934 to system coordinates 914. Short term corrections 934 to system coordinates 914 are temporary and are used to account for temporal physical effects affecting the wafer and/or the setup (e.g. stage 422 and/or imager 424). For example, one or more CTPs from CTPs 926—characterized by (i) having been determined for a last grabbed frame (or a plurality of most recently grabbed frames), and (ii) being associated with one or more physical effect with sufficiently long coherence times, such as to affect one or more frames to be grabbed next—may be used to temporarily update system coordinates 914. The temporary update associated with each such CTP may be "lifted" (i.e. removed) after passage of a time interval greater than the respective coherence time. These CTPs may then be computed again based on up-to-date scan data (i.e. scan data pertaining to more recently grabbed frames, e.g. a last grabbed frame).

When a scan of a slice is completed, prior to commencing the scan of the next slice, operation 918 may be repeated taking into account long-term physical effects and imperfections impacting the wafer and/or the setup, which have been detected during the scan of the last scanned slice. More generally, estimates of previously detected long-term physical effects may be improved during the scan of a slice. These up-to-date estimates may be used in operation 918 to adjust mechanical scan parameters prior to commencing the scan of a next slice.

Calibration data generated at each stage of the scan and corresponding scan data may be sent to database 906. Per each resolvable grabbed frame, CTPs 926, associated therewith, may be sent to database 906. The calibration data may undergo long-term analysis (i.e. not in run-time) to improve the scanning recipe and/or correct default coordinate system 902, thereby potentially leading to faster defect coordinates computation rates.

As used herein, according to some embodiments, the term "sample", with reference to an object analyzed using the methods and/or systems of the present disclosure, covers patterned wafers, optical photomasks, and reticles.

As used herein, according to some embodiments, the term "calibration data", with reference to an image frame, may include computed CTPs and/or generated displacement mappings pertaining to the image frame. According to some embodiments, calibration data obtained during a scan may be used as reference data in a subsequent stage of the scan.

As used herein, according to some embodiments, the terms "frame" and "image frame" may be used interchangeably.

As used herein, according to some embodiments, the term "frame target", when referring to an image frame, will be understood to refer to a subframe of the image frame, which depicts a sub-area of the wafer area corresponding to the image frame, and which exhibits image pattern recognition properties desirable in a registration target (i.e. high contrast edges, pattern uniqueness, and so on).

As used herein, according to some embodiments, the term "target", when employed with respect to a scanned image (e.g. an image frame), may be used to refer to the image of the target. In particular, according to some embodiments, when employed with respect to an image frame, the terms "target" and "frame target" may be employed interchangeably.

As used herein, according to some embodiments, the terms "coordinate transformation" and "coordinate mapping" may be used interchangeably.

As used herein, according to some embodiments, the terms "identifiable target" and "registration target" may be used interchangeably.

As used herein, according to some embodiments, an image area (e.g. a subframe of an image frame) may be referred to as "resolvable" when including at least one resolvable (image of a) target. Similarly, according to some embodiments, an image area may be referred to as "unresolvable" when including no resolvable (image of a) target.

While the disclosure has focused on scanning and inspection of wafers, it will be clear to the skilled person that the disclosed systems and methods are also applicable to optical photomasks and reticles used in wafer fabrication.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods according to some embodiments may be described in a specific sequence, methods of the disclosure may include some or all of the described operations carried out in a different order. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A computer-implemented method for generating calibration data usable for analysis of a sample, the method comprising:
   identifying targets in an image frame pertaining to a scanned area of a sample;
   computing displacements of the targets relative to positions thereof as given by, or derived from, reference data of the scanned area;
   based at least on the computed displacements of the targets, determining values of coordinate transformation parameters (CTPs) relating coordinates of the image frame to coordinates of the scanned area as given by, or derived from, the reference data; and
   using at least the CTPs to obtain displacements of multiple segments in the image frame, thereby generating a displacement mapping of the image frame or at least a part thereof.

2. The method of claim 1, wherein the CTPs comprise at least three independent parameters.

3. The method of claim 2, wherein each of the at least three independent parameters characterizes a respective correlation which persists across the image frame.

4. The method of claim 2, wherein the CTPs comprise one or more of parameters characterizing global shifts, linear scaling, fixed-angle skewing, and rotations.

5. The method of claim 1, wherein the reference data comprise one or more of design data, CTPs and/or displacement mappings generated from scan data of the sample obtained during a recipe setup, and data obtained in a scan of another sample of the same design or comprising features of similar architecture to features within the scanned area.

6. The method of claim 1, wherein prior to the computing the displacements of the targets, the reference data is calibrated based on up-to-date system coordinates, which were generated taking into account previously obtained scan data.

7. The method of claim 1, wherein at least some of the segments have a size of a pixel.

8. The method of claim 1, wherein the sample is a patterned wafer.

9. The method of claim 8, wherein the scanned area is positioned along a slice extending through a first die of the wafer, and wherein the method further comprises repetition thereof with respect to other scanned areas of the first die, which are positioned along the slice.

10. The method of claim 9, wherein the scanned area and the other scanned areas are scanned during a continuous scan along the slice on the patterned wafer, and wherein the CTPs of at least one of the other scanned areas are determined taking into account the CTPs of the scanned area.

11. The method of claim 9, further comprising an initial operation which comprises optimizing (i) a height of image frames, pertaining to the scanned areas, respectively, along the slice, and (ii) a choice of the CTPs, such as to attain a required accuracy at a maximum, or substantially maximum, throughput.

12. The method of claim 9, further comprising generating displacement mappings of additional images frames respectively pertaining to additional scanned areas scanned during a continuous scan along the slice, which are positioned in additional dies along a die-column comprising the first die, wherein displacement mappings of a first group of the additional image frames are directly generated based at least on computed displacements of targets therein relative to corresponding positions of the targets as given by reference data; and wherein displacement mappings of a second group of image frames are generated based at least on computed displacements of targets therein relative to calibrated positions of corresponding targets in corresponding image frames, which pertain to scanned areas in a respective previously scanned die in the die-column.

13. The method of claim 12, wherein the previously scanned die is a last scanned die during the continuous scan.

14. The method of claim 12, repeated slice-by-slice, thereby generating calibration data for one or more die-columns of the wafer.

15. The method of claim 9, wherein, when an image frame, which pertains to one of the other scanned areas along the slice, is characterized by an insufficient number of identifiable targets and/or an insufficiently uniform distribution of identifiable targets, such that, based solely on displacements of identifiable targets in the image frame, a required accuracy of a displacement mapping of the image frame is not attainable, the displacement mapping of the image frame is interpolated or extrapolated based on, or also taking into account, calibration data of image frames pertaining to scanned areas near the scanned area, which pertains to the image frame.

16. The method of claim 1, further comprising scanning the sample and generating the calibration data in runtime as the sample is being scanned.

17. A computerized system for generating calibration data usable for analysis of a sample, the system comprising a displacement analysis module, wherein the displacement analysis module is configured to:
 compute displacements of targets, identified in one or more image frames corresponding to one or more areas of a sample, respectively, relative to positions thereof as given by, or derived from, reference data of the one or more areas;
 based at least on the computed displacements of the targets, determine values of coordinate transformation parameters (CTPs) relating coordinates of the one or more image frames to coordinates of the scanned areas as given by, or derived from, the reference data of the one or more areas, respectively; and
 use at least the CTPs to determine displacements of multiple segments in the one or more image frames, thereby generating one or more displacement mappings of the one or more image frames or at least of one or more parts thereof.

18. A sample analysis system comprising:
 scanning equipment comprising an imager and configured to scan a region of a sample; and
 a processing and memory circuitry comprising the computerized system of claim 17 and a sample analysis module configured to detect potential defects in one or more areas of the region taking into account displacement mappings of the one or more areas generated by the displacement analysis module of the computerized system.

19. The sample analysis system of claim 18, wherein the imager comprises an optical-based imager, and wherein, optionally, the imager comprises a large field-of-view scanning tool, and/or wherein the imager comprises a scanning electron microscope.

20. A non-transitory computer-readable medium comprising instructions, executable by a processing circuitry of a system for generating calibration data usable for analysis of a sample, the instructions being configured to cause the system to:
 identify targets in an image frame corresponding to a scanned area of a sample;
 compute displacements of the targets relative to positions thereof as given by, or derived from, reference data of the scanned area;
 based at least on the computed displacements of the targets, determine values of coordinate transformation parameters (CTPs) relating coordinates of the image frame to coordinates the scanned area, as given by, or derived from, the reference data; and
 use at least the CTPs to obtain displacements of multiple segments in the image frame, thereby generating a displacement mapping of the image frame or at least a part thereof.

* * * * *

UNITED STATES PATENT AND TRADEMARK OFFICE
CERTIFICATE OF CORRECTION

PATENT NO. : 11,644,426 B2
APPLICATION NO. : 16/990593
DATED : May 9, 2023
INVENTOR(S) : Yariv Simovitch It is certified that error appears in the above-identified patent and that said Letters Patent is hereby corrected as shown below:

In the Specification

Column 1 Line 10, please add the following new heading and paragraph before the heading BACKGROUND:
--STATEMENT AS TO RIGHTS TO INVENTIONS MADE UNDER FEDERALLY SPONSORED RESEARCH AND DEVELOPMENT
The project leading to this application has received funding from the ECSEL Joint Undertaking (JU) under grant agreement No. 737417 (R3PowerUp). The JU receives support from the European Union's Horizon 2020 research and innovation programme and Italy, Germany, Belgium, Sweden, Austria, Romania, Slovakia, France, Poland, Spain, Ireland, Switzerland, Israel.--

Signed and Sealed this
Twenty-first Day of November, 2023

Katherine Kelly Vidal
*Director of the United States Patent and Trademark Office*